(12) United States Patent
Mellet et al.

(10) Patent No.: US 9,005,072 B2
(45) Date of Patent: Apr. 14, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); Daryl A. Wilton, Macomb, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/094,219

(22) Filed: Dec. 2, 2013

(65) Prior Publication Data

US 2014/0162830 A1    Jun. 12, 2014

Related U.S. Application Data

(60) Provisional application No. 61/734,729, filed on Dec. 7, 2012.

(51) Int. Cl.
*F16H 3/62* (2006.01)
*F16H 37/06* (2006.01)
*F16H 3/66* (2006.01)

(52) U.S. Cl.
CPC ............ *F16H 3/66* (2013.01); *F16H 2200/006* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 7,736,262 B2 * | 6/2010 | Suh | 475/276 |
| 7,976,424 B2 | 7/2011 | Phillips et al. | |
| 8,007,394 B2 * | 8/2011 | Phillips et al. | 475/275 |
| 2002/0091032 A1 * | 7/2002 | Hayabuchi et al. | 475/278 |
| 2006/0014603 A1 * | 1/2006 | Raghavan et al. | 475/269 |

FOREIGN PATENT DOCUMENTS

| | | |
|---|---|---|
| DE | 102004041506 A1 | 3/2006 |
| DE | 102004041507 A1 | 3/2006 |
| DE | 102009047768 A1 * | 6/2011 |

* cited by examiner

*Primary Examiner* — Justin Holmes
*Assistant Examiner* — Timothy Hannon

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and a brake actuatable in combinations of four to establish a plurality of forward gear ratios and at least one reverse gear ratio.

11 Claims, 21 Drawing Sheets

| GEAR STATE | RATIO STEP | 32 CLUTCH | 34 BRAKE | 26 CLUTCH | 24 CLUTCH | 30 CLUTCH | 28 CLUTCH |
|---|---|---|---|---|---|---|---|
| 1ST | 4.70 | X | X |   |   | X | X |
| 1ST | 4.70 | X | X | X |   | X |   |
| 1ST | 4.70 | X | X |   |   | X |   |
| 1ST | 4.70 | X | X |   | X | X |   |
| 2ND | 3.02 | X | X | X | X |   |   |
| 3RD | 2.10 | X |   | X | X | X |   |
| 4TH | 1.71 | X |   | X | X |   | X |
| 5TH | 1.49 | X |   | X |   | X | X |
| 6TH | 1.27 | X |   |   | X | X | X |
| 7TH | 1.00 |   |   | X | X | X | X |
| 8TH | 0.85 |   | X |   | X | X | X |
| 9TH | 0.70 |   | X | X |   | X | X |
| 10TH | 0.64 |   | X | X | X |   | X |
| REV | -4.53 | X | X |   | X |   | X |

X = ON - ENGAGED CARRYING TORQUE

| GEAR STATE | GEAR RATIO | RATIO STEP | 134 BRAKE | 132 CLUTCH | 126 CLUTCH | 130 CLUTCH | 124 CLUTCH |
|---|---|---|---|---|---|---|---|
| REV | -3.928 |  | X | X |  |  | X |
| N |  | -0.85 |  |  |  |  |  |
| 1ST | 4.615 |  | X | X |  | X |  |
| 2ND | 3.038 | 1.52 | X | X | X |  |  |
| 3RD | 2.065 | 1.47 |  | X | X | X |  |
| 4TH | 1.658 | 1.25 |  | X | X |  | X |
| 5TH | 1.259 | 1.32 |  | X |  | X | X |
| 6TH | 1.000 | 1.26 |  |  | X | X | X |
| 7TH | 0.849 | 1.18 | X |  |  | X | X |
| 8TH | 0.658 | 1.29 | X |  | X |  | X |

X = ON - ENGAGED CARRYING TORQUE

FIG. 30

| GEAR STATE | RATIO STEP | 132 CLUTCH | 134 BRAKE | 130 CLUTCH | 124 CLUTCH | 126 CLUTCH | 128 CLUTCH |
|---|---|---|---|---|---|---|---|
| 1ST | 4.74 | X | X | X |  |  |  |
| 2ND | 3.03 | X | X |  |  | X |  |
| 3RD | 2.12 | X |  | X |  | X |  |
| 4.1 | 1.73 | X |  |  |  | X | X |
| 4.2 | 1.73 | X |  |  | X |  | X |
| 4.3 | 1.73 | X |  |  | X | X |  |
| 5TH | 1.50 | X |  | X |  |  | X |
| 6TH | 1.24 | X |  | X | X |  |  |
| 7.1 | 1.00 |  |  | X |  | X | X |
| 7.2 | 1.00 |  |  | X | X |  | X |
| 7.3 | 1.00 |  |  | X | X | X |  |
| 8TH | 0.87 |  | X | X | X |  |  |
| 9TH | 0.69 |  | X | X |  |  | X |
| 10.1 | 0.64 |  | X |  |  | X | X |
| 10.2 | 0.64 |  | X |  | X |  | X |
| 10.3 | 0.64 |  | X |  | X | X |  |
| REV | -6.05 | X | X |  | X |  |  |

X = ON - ENGAGED CARRYING TORQUE

FIG. 31

| GEAR STATE | RATIO STEP | 132 CLUTCH | 134 BRAKE | 124 CLUTCH | 126 CLUTCH | 128 CLUTCH | 130 CLUTCH |
|---|---|---|---|---|---|---|---|
| 1ST | 4.74 | X | X | | | X | X |
| 1ST | 4.74 | X | X | | X | | X |
| 1ST | 4.74 | X | X | X | | | X |
| 1ST | 4.74 | X | X | | | | X |
| 2ND | 3.03 | X | X | X | | X | |
| 3RD | 2.15 | | X | X | | X | X |
| 4TH | 1.76 | | X | X | X | X | |
| 5TH | 1.52 | | X | X | X | | X |
| 6TH | 1.27 | | X | | X | X | X |
| 7TH | 1.00 | | | X | X | X | X |
| 8TH | 0.86 | X | | | X | X | X |
| 9TH | 0.69 | X | | X | X | | X |
| 10TH | 0.64 | X | | X | X | X | |
| REV | -4.97 | X | X | | X | X | |

X = ON - ENGAGED CARRYING TORQUE

FIG. 40

MULTI-SPEED TRANSMISSION

CROSS-REFERENCE TO RELATED APPLICATIONS

This application claims the benefit of U.S. Provisional Application No. 61/734,729 filed Dec. 7, 2012. The disclosure of the above application is incorporated herein by reference.

FIELD

The invention relates generally to a multiple speed transmission, and more particularly, to a transmission having a plurality speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and a brake.

The clutches and brake can be of any type including but not limited to a fiction clutch, a friction band, a one way clutch, a selectable one way clutch, a dog clutch, a synchronizer and similar devices. Furthermore, any node can use a single device or a combination of these devices e.g. the brake may be configured as a dog clutch and a one way clutch combination or a one way clutch and friction clutch combination. Similarly, several other combinations are possible.

In another embodiment of the present invention, the transmission includes: first, second, third and fourth planetary gear sets each having a sun gear, a carrier member and a ring gear, and the input member is continuously connected for common rotation with the carrier member of the second planetary gear set, and the output member is continuously connected for common rotation with the carrier member of the fourth planetary gear set.

In yet another embodiment of the present invention, the transmission includes a first interconnecting member that continuously interconnects a first member of the first planetary gear set with a first member of the second planetary gear set.

In yet another embodiment of the present invention, the transmission includes a second interconnecting member that continuously interconnects a third member of the second planetary gear set with a third member of the third planetary gear set.

In yet another embodiment of the present invention, the transmission includes a third interconnecting member that continuously interconnects a first member of the third planetary gear set with a third member of the fourth planetary gear set.

In yet another embodiment of the present invention, the transmission includes a grounding member for continuously interconnecting the first members of the first and second planetary gear sets to a stationary member.

In still another embodiment of the present invention, the transmission includes a first torque transmitting mechanism that is selectively engageable to interconnect the second member of the third planetary gear set with a common structural member.

In still another embodiment of the present invention, the transmission includes a second torque transmitting mechanism that is selectively engageable to interconnect the third member of the second planetary gear set and the third member of the third planetary gear set with the common structural member.

In still another embodiment of the present invention, the transmission includes a third torque transmitting mechanism that is selectively engageable to interconnect the first member of the fourth planetary gear set with the common structural member.

In still another embodiment of the present invention, the transmission includes a fourth torque transmitting mechanism that is selectively engageable to interconnect the second member of the second planetary gear set and the input member with the third member of the fourth planetary gear set and the first member of the third planetary gear set.

In still another embodiment of the present invention, the transmission includes a fifth torque transmitting mechanism that is selectively engageable to interconnect the second member of the first planetary gear set with the first member of the fourth planetary gear set.

In still another embodiment of the present invention, the transmission includes a sixth torque transmitting mechanism that is selectively engageable to interconnect the first member of the first planetary gear set and the first member of the second planetary gear set with the stationary member.

In yet another embodiment of the present invention, the torque transmitting mechanisms are selectively engageable in combinations of at least four to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5 is a truth table presenting an example of a state of engagement of various torque transmitting elements to produce multiple forward and at least one reverse speed or gear ratios of the transmissions illustrated in FIGS. 1-4.

FIG. 28 is a lever diagram of an embodiment of a transmission according to the principles of present invention;

FIG. 29 is a diagrammatic illustration of a variation of the transmission of FIG. 28 according to the principles of the present invention;

FIG. 30 is a truth table presenting an example of a state of engagement of various torque transmitting elements to produce multiple forward and at least one reverse speed or gear ratios of the transmissions illustrated in FIGS. 28-29;

FIG. 31 is a truth table presenting an example of a state of engagement of various torque transmitting elements to produce multiple forward and at least one reverse speed or gear ratios of the transmissions illustrated in FIGS. 6-27.

FIG. 40 is a truth table presenting an example of a state of engagement of various torque transmitting elements to produce multiple forward and at least one reverse speed or gear ratios of the transmissions illustrated in FIGS. 32-39.

DETAILED DESCRIPTION

The following description is merely exemplary in nature and is not intended to limit the present disclosure, application, or uses.

Figure 1:
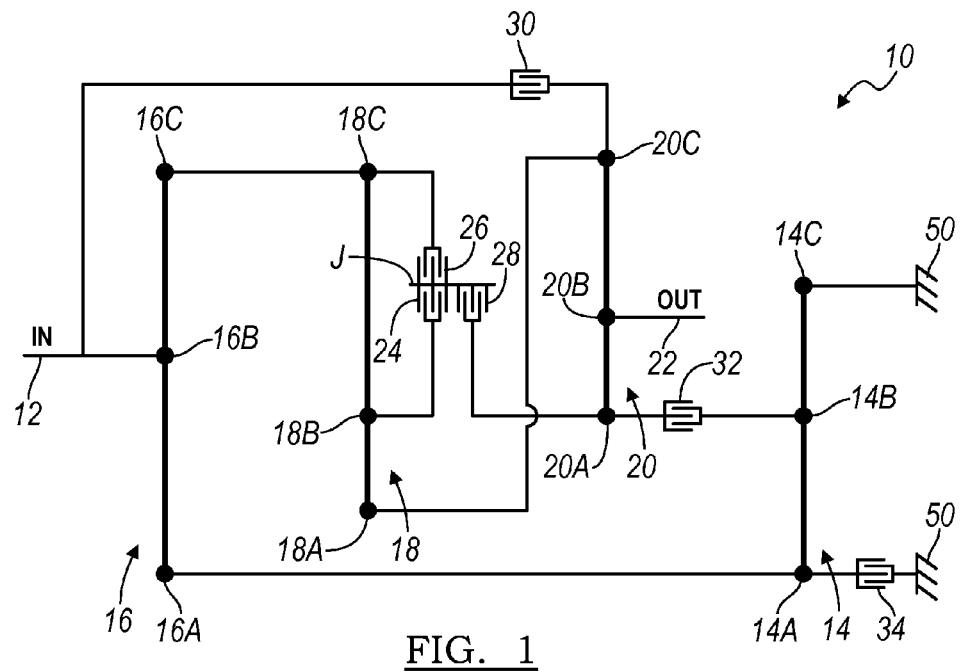
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is continuously coupled to the second node 20B of the fourth planetary gear set 20.

The first node 14A of the first planetary gear set 14 is coupled to the first node 16A of the second planetary gear set 16. The third node 14C of the first planetary gear set 14 is coupled to ground or to a transmission housing 50. The third node 16C of the second planetary gear set 16 is coupled to the third node 18C of the third planetary gear set 18. The first node 18A of the third planetary gear set 18 is coupled to the third node 20C of the fourth planetary gear set 20

A first clutch 24 selectively connects the second node 18B of the third planetary gear set 18 with a common structural member or hub J. A second clutch 26 selectively connects the third node 16C of the second planetary gear set 16 and the third node 18C of the third planetary gear set 18 with the common structural member or hub J. A third clutch 28 selectively connects the first node 20A of the fourth planetary gear set 20 with the common structural member or hub J. A fourth clutch 30 selectively connects the second node 16B of the second planetary gear set 16 and the input member 12 with the third node 20C of the fourth planetary gear set 20 and the first node 18A of the third planetary gear set 18. A fifth clutch 32 selectively connects the second node 14B of the first planetary gear set 14 with the first node 20A of the fourth planetary gear set 20. A brake 34 selectively connects the first node 14A of the first planetary gear set 14 with the stationary member or transmission housing 50.

Figure 2:
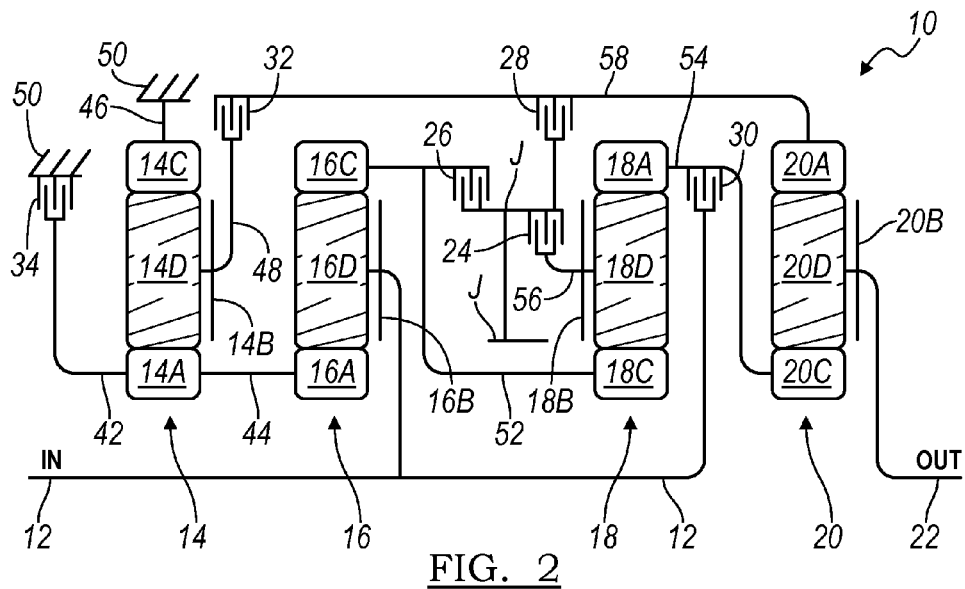
FIG. 2 is a diagrammatic illustration of a variation of the transmission of FIG. 1 according to the principles of the present invention.

Referring now to FIG. 2, a stick diagram presents a schematic layout of an embodiment of the multi-speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and with a second shaft or interconnecting member 44. The ring gear member 14C is connected to transmission housing 50 through a third shaft or interconnecting member 46. The planet carrier member 14B is connected for common rotation with a fourth shaft or interconnecting member 48. The set of planet gears 14D are each configured to intermesh with both the sun gear member 14A and the ring gear member 14C.

The second planetary gear set 16 includes a sun gear member 16A, a ring gear member 16C and a planet gear carrier member 16B that rotatably supports a set of planetary gears 16D (only one of each is shown). The sun gear member 16A is connected for common rotation with the second shaft or interconnecting member 44. The ring gear member 16C is connected for common rotation with a fifth shaft or interconnecting member 52. The planet carrier member 16B is connected for common rotation with the input shaft or member 12. The planet gears 16D are each configured to intermesh with both the ring gear member 16C and the sun gear member 16A.

The third planetary gear set 18 includes a sun gear member 18C, a ring gear member 18A and a planet gear carrier member 18B that rotatably supports a set of planet gears 18D (only one of which is shown). The sun gear member 18C is connected for common rotation with the fifth shaft or interconnecting member 52. The ring gear member 18A is connected for common rotation with a sixth shaft or interconnecting member 54. The planet carrier member 18B is connected for common rotation with a seventh shaft or interconnecting member 56. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with a sixth shaft or interconnecting member 54. The ring gear member 20A is connected for common rotation with an eighth shaft or interconnecting member 58. The planetary gear carrier member 20B is connected for common rotation with the output shaft or member 22. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, third, fourth, fifth and sixth clutches 24, 26, 28, 30 and 32 the brake 34 allow for selective interconnection of the shafts or interconnecting members 42, 44, 46, 48, 52, 54, 56 and 58 to the members of the planetary gear sets 14, 16, 18, 20 and the housing 50.

For example, the first clutch 24 is selectively engageable to connect the common structural member or hub J with the seventh shaft or interconnecting member 56. The second clutch 26 is selectively engageable to connect the common structural member or hub J with the fifth shaft or interconnecting member 52. The third clutch 28 is selectively engageable to connect the common structural member or hub J with the eighth shaft or interconnecting member 58. The fourth clutch 30 is selectively engageable to connect the input shaft or member 12 with the sixth shaft or interconnecting member 54. The fifth clutch 32 is selectively engageable to connect the fourth shaft or interconnecting member 48 with the eighth shaft or interconnecting member 58. The brake 34 is selectively engageable to connect the first shaft or interconnecting member 42 with the stationary element or the transmission housing 50 in order to restrict the member 42 from rotating relative to the transmission housing 50. In turn, the components of the planetary gear sets connected to each of the connecting members are also connected or restricted accordingly.

Figure 3:
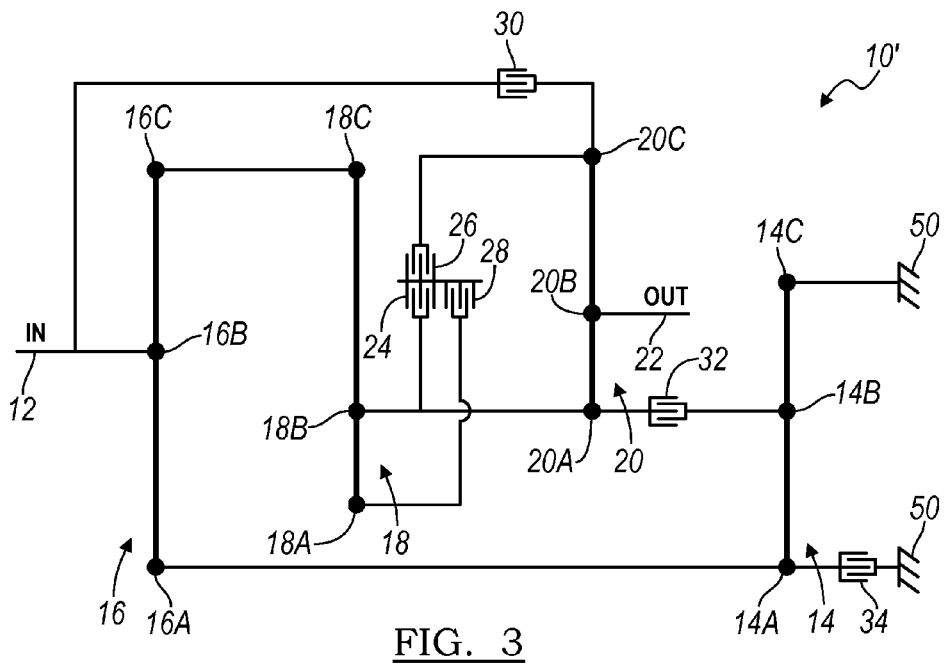
FIG. 3 is a lever diagram of an embodiment of a transmission according to the principles of present invention.

Referring now to FIG. 3, another embodiment of a multi-speed transmission 10' is illustrated in a lever diagram format. Transmission 10' has the same components and structural elements as transmission 10 as indicated by like reference numbers. However transmission 10' has a different set of connections for first clutch 24, second clutch 26 and third clutch 28. More specifically, the first clutch 24 is now selectively engageable to connect the common structural member or hub J with the second member 18B of the second planetary gear set 18 and the first member 20A of the fourth planetary gear set 20. The second clutch 26 is now selectively engageable to connect the common structural member or hub J with the third member 20C of the fourth planetary gear set 20. The third clutch 28 is now selectively engageable to connect the common structural member or hub J with the first member 18A of the third planetary gear set 18.

Figure 4:
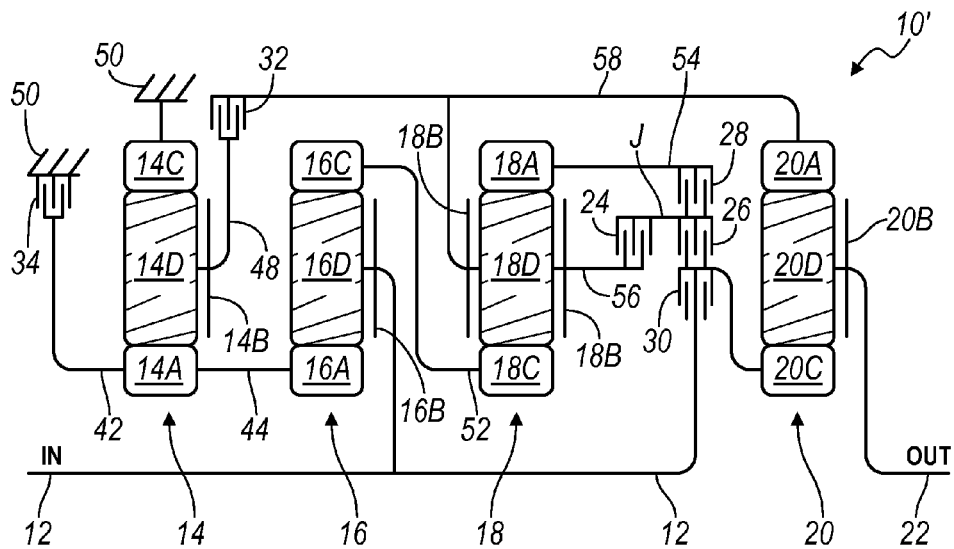
FIG. 4 is a diagrammatic illustration of a variation of the transmission of FIG. 3 according to the principles of the present invention.

Referring now to FIG. 4, a stick diagram presents a schematic layout of another embodiment of the multi-speed transmission 10' according to one form of the present invention. In accordance with the transmission 10' of FIG. 3, the interconnections of first clutch 24, second clutch 26 and third clutch 28 are further illustrated. The first clutch 24 is now selectively engageable to connect the common structural member or hub J with the carrier member 18B of the second planetary gear set 18 and the ring gear 20A of the fourth planetary gear set 20. The second clutch 26 is now selectively engageable to connect the common structural member or hub J with the sun gear 20C of the fourth planetary gear set 20. The third clutch 28 is now selectively engageable to connect the common structural member or hub J with the ring gear 18A of the third planetary gear set 18.

Referring now to FIGS. 1-4 and 5, the operation of the multi-speed transmissions 10 and 10' will be described. It will be appreciated that transmission 10 and 10' are capable of transmitting torque from the input shaft or member 12 to the output shaft or member 22 in multiple forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, fifth clutch 32 and brake 34), as will be explained below.

FIG. 5 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10 and 10'. Of course, other gear ratios are achievable depending on the gear diameter, gear teeth count and gear configuration selected.

For example, a reverse gear is established by engaging or activating the first clutch 24, third clutch 28, the fifth clutch 32 and the brake 34. The first clutch 24 connects the common structural member or hub J with the seventh shaft or interconnecting member 56. The third clutch 28 connects the common structural member or hub J with the eighth shaft or interconnecting member 58. The fifth clutch 32 connects the fourth shaft or interconnecting member 48 with the eighth shaft or interconnecting member 58. The brake 34 connects the first shaft or interconnecting member 42 with the stationary element or the transmission housing 50 in order to restrict the member 42 from rotating relative to the transmission housing 50, which restricts the sun gears 14A and 16A from rotating relative to the transmission housing 50. Likewise, the ten forward ratios are achieved through different combinations of clutch and brake engagement, as shown in FIG. 5, by way of example. Moreover, FIG. 5 shows four different clutch and brake engagement combinations contemplated by the present invention for achieving first gear.

Figure 6:
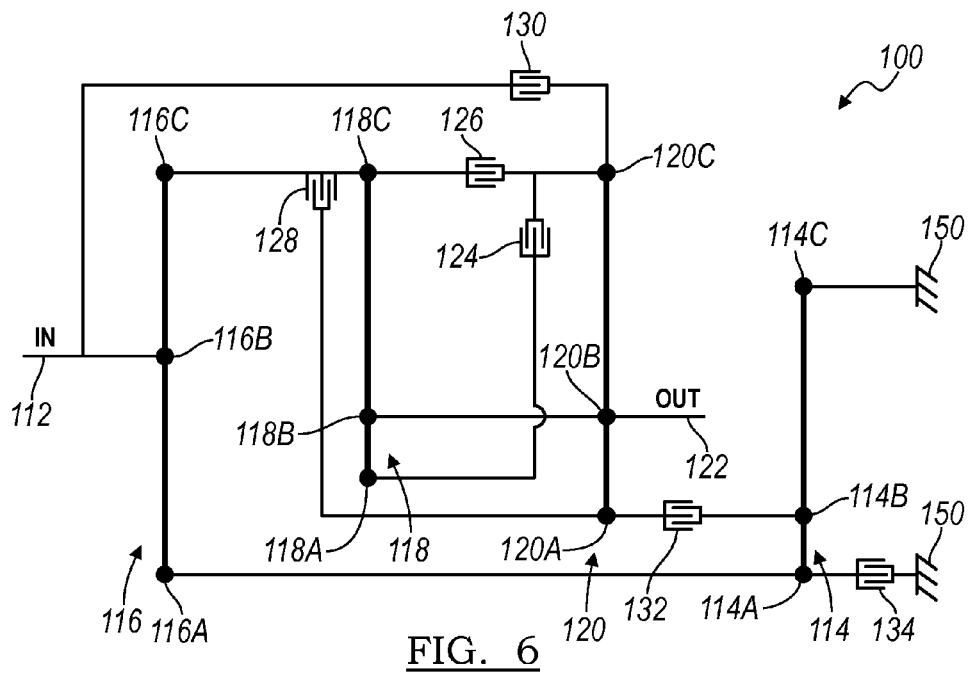
FIG. 6 is a lever diagram of an embodiment of a transmission according to the principles of present invention.

Referring now to FIG. 6, a transmission 100 is illustrated in lever diagram form, in accordance with another embodiment of the present invention. Transmission 100 includes an input shaft or member 112, a first planetary gear set 114, a second planetary gear set 116, a third planetary gear set 118, a fourth planetary gear set 120, and an output shaft or member 122. The first planetary gear set 114 has three nodes: a first node 114A, a second node 114B, and a third node 114C. The second planetary gear set 116 has three nodes: a first node 116A, a second node 116B and a third node 116C. The third planetary gear set 118 has three nodes: a first node 118A, a second node 118B and a third node 118C. The fourth planetary gear set 120 has three nodes: a first node 120A, a second node 120B and a third node 120C.

The input member 112 is continuously coupled to the second node 116B of the second planetary gear set 116. The output member 122 is continuously coupled to the second node 120B of the fourth planetary gear set 120.

The first node 114A of the first planetary gear set 114 is coupled to the first node 116A of the second planetary gear set 116. The third node 114C of the first planetary gear set 114 is coupled to ground or to a transmission housing 150. The third node 116C of the second planetary gear set 116 is coupled to the third node 118C of the third planetary gear set 118. The second node 118B of the third planetary gear set 118 is coupled to the second node 120B of the fourth planetary gear set 120.

A first clutch 124 selectively connects the first node 118A of the third planetary gear set 118 with the third node 120C of the fourth planetary gear set 120. A second clutch 126 selectively connects the third node 116C of the second planetary gear set 116 and the third node 118C of the third planetary gear set 118 with the third node 120C of the fourth planetary gear set 120. A third clutch 128 selectively connects the first node 120A of the fourth planetary gear set 120 with the third node 116C of the second planetary gear set 116 and the third node 118C of the third planetary gear set 118. A fourth clutch 130 selectively connects the second node 116B of the second planetary gear set 116 and the input member 112 with the third node 120C of the fourth planetary gear set 120. A fifth clutch 132 selectively connects the second node 114B of the first planetary gear set 114 with the first node 120A of the fourth planetary gear set 120. A brake 134 selectively connects the first node 114A of the first planetary gear set 114 and the first node 116A of the second planetary gear set 116 with the stationary member or transmission housing 150.

Figure 7:
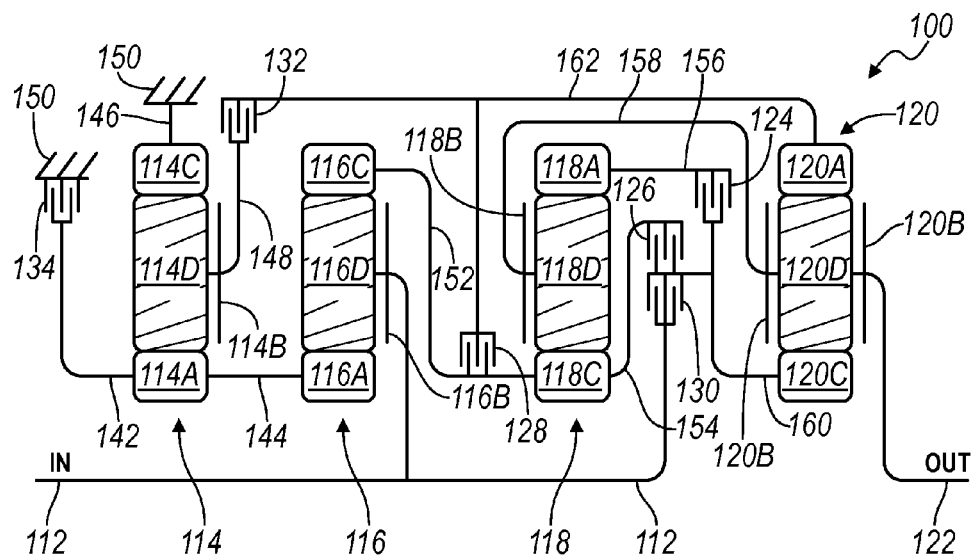
FIG. 7 is a diagrammatic illustration of a variation of the transmission of FIG. 6 according to the principles of the present invention.

Referring now to FIG. 7, a stick diagram presents a schematic layout of an embodiment of the multi-speed transmission 100 according to one form of the present invention. In FIG. 7, the numbering from the lever diagram of FIG. 6 is carried over. The clutches and couplings are correspondingly presented whereas the nodes of the planetary gear sets now appear as components of planetary gear sets such as sun gears, ring gears, planet gears and planet gear carriers.

For example, the first planetary gear set 114 includes a sun gear member 114A, a ring gear member 114C and a planet gear carrier member 114B that rotatably supports a set of planet gears 114D (only one of which is shown). The sun gear member 114A is connected for common rotation with a first shaft or interconnecting member 142 and with a second shaft or interconnecting member 144. The ring gear member 114C is connected to transmission housing 150 through a third shaft or interconnecting member 146. The planet carrier member 114B is connected for common rotation with a fourth shaft or interconnecting member 148. The set of planet gears 114D are each configured to intermesh with both the sun gear member 114A and the ring gear member 114C.

The second planetary gear set 116 includes a sun gear member 116A, a ring gear member 116C and a planet gear carrier member 116B that rotatably supports a set of planetary gears 116D (only one of each is shown). The sun gear member 116A is connected for common rotation with the second shaft or interconnecting member 144. The ring gear member 116C is connected for common rotation with a fifth shaft or interconnecting member 152. The planet carrier member 116B is connected for common rotation with the input shaft or member 112. The planet gears 116D are each configured to intermesh with both the ring gear member 116C and the sun gear member 116A.

The third planetary gear set 118 includes a sun gear member 118C, a ring gear member 118A and a planet gear carrier member 118B that rotatably supports a set of planet gears 118D (only one of which is shown). The sun gear member 118C is connected for common rotation with the fifth shaft or interconnecting member 152 and with a sixth shaft or interconnecting member 154. The ring gear member 118A is connected for common rotation with a seventh shaft or interconnecting member 156. The planet carrier member 118B is connected for common rotation with an eighth shaft or interconnecting member 158. The planet gears 118D are each configured to intermesh with both the sun gear member 118C and the ring gear member 118A.

The fourth planetary gear set 120 includes a sun gear member 120C, a ring gear member 120A and a planet gear carrier member 120B that rotatably supports a set of planet gears 120D (only one of which is shown). The sun gear member 120C is connected for common rotation with a ninth shaft or interconnecting member 160. The ring gear member 120A is connected for common rotation with a tenth shaft or interconnecting member 162. The planetary gear carrier member 120B is connected for common rotation with the eighth shaft or interconnecting member 158 and the output shaft or member 122. The planet gears 120D are each configured to intermesh with both the sun gear member 120C and the ring gear member 120A.

The input shaft or member 112 is continuously connected to an input source, such as an engine (not shown) or a turbine of a torque converter (not shown). The output shaft or member 122 is continuously connected with another output such as the final drive unit or transfer case (not shown).

The torque-transmitting mechanisms, including the first, second, third, fourth, fifth and sixth clutches 124, 126, 128, 130 and 132 the brake 134 allow for selective interconnection of the shafts or interconnecting members 142, 144, 146, 148, 152, 154, 156, 158, 160 and 162 to the members of the planetary gear sets 114, 116, 118, 120 and the housing 150.

For example, the first clutch 124 is selectively engageable to connect the seventh shaft or interconnecting member 156 with the ninth shaft or interconnecting member 160. The second clutch 126 is selectively engageable to connect the sixth shaft or interconnecting member 154 with the ninth shaft or interconnecting member 160. The third clutch 128 is selectively engageable to connect the fifth shaft or interconnecting member 152 with the tenth shaft or interconnecting member 162. The fourth clutch 130 is selectively engageable to connect the input shaft or member 112 with the ninth shaft or interconnecting member 160. The fifth clutch 132 is selectively engageable to connect the fourth shaft or interconnecting member 148 with the tenth shaft or interconnecting member 162. The brake 134 is selectively engageable to connect the first shaft or interconnecting member 142 with the stationary element or the transmission housing 150 in order to restrict the member 142 from rotating relative to the transmission housing 150. In turn, the components of the planetary gear sets connected to each of the connecting members are also connected or restricted accordingly.

Figure 8:
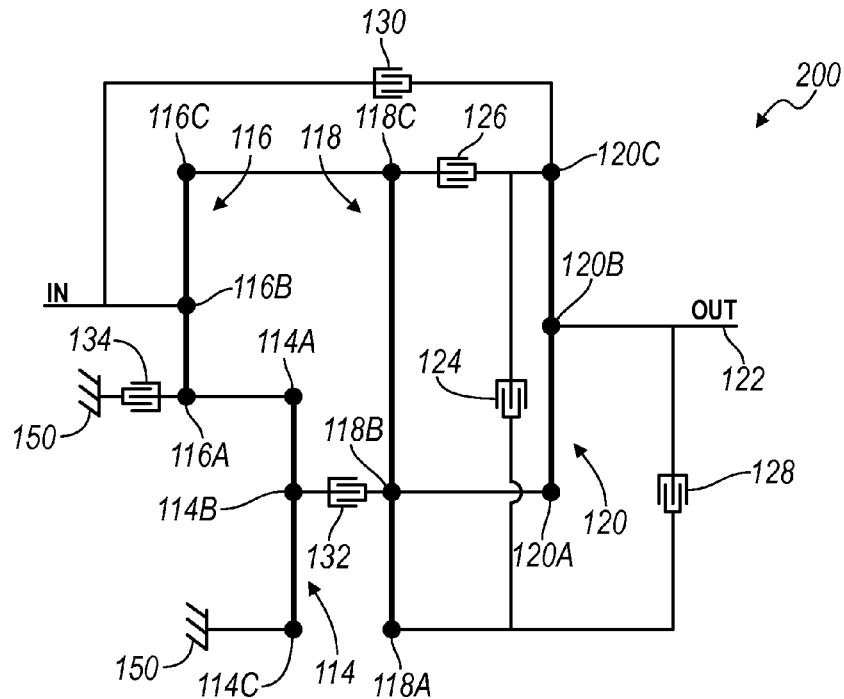
FIG. 8 is a lever diagram of an embodiment of a transmission according to the principles of present invention.

Referring now to FIG. 8, another embodiment of a multi-speed transmission 200 is illustrated in a lever diagram format. Transmission 200 has the same components and structural elements as transmission 100 as indicated by like reference numbers. However transmission 200 has a different set of connections for third clutch 128 and fifth clutch 132. More specifically, the third clutch 128 is now selectively engageable to connect the output member or shaft 122 and the second member 120B of the fourth planetary gear set 120 with the first member 118A of the second planetary gear set 118. The fifth clutch 132 is now selectively engageable to connect the second member 114B of the first planetary gear set 114 with the second member 118B of the third planetary gear set 118 and with the first member 120A of the fourth planetary gear set 120. Moreover, the interconnecting shaft or member continuously connecting the second member 118B of the third planetary gear set 118 and the second member 120B of the fourth planetary gear set 120 is not present. However, a new connection is made fixedly connecting the second member 118B of the third planetary gear set 118 to the first member 120A of the fourth planetary gear set 120.

Figure 9:
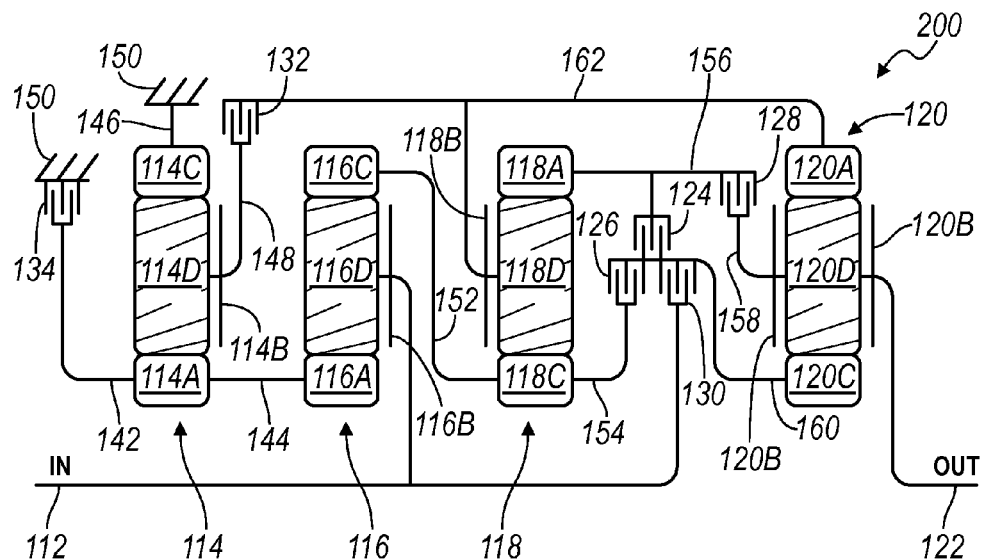
FIG. 9 is a diagrammatic illustration of a variation of the transmission of FIG. 8 according to the principles of the present invention.

Referring now to FIG. 9, a stick diagram presents a schematic layout of the embodiment of the multi-speed transmission 200 according to one form of the present invention. In accordance with the transmission 200 of FIG. 8, the interconnections of third clutch 128 and fifth clutch 132 are further illustrated. The third clutch 128 is now selectively engageable to connect the ring gear 118A of the second planetary gear set 118 with the carrier member 120B of the fourth planetary gear set 120. The fifth clutch 132 is now selectively engageable to connect the carrier member 114B of the first planetary gear set 114 with the carrier member 118B of the second planetary gear set 118 and the ring gear 120A of the fourth planetary gear set 120. Moreover, the carrier member 118B of the second planetary gear set 118 is now continuously interconnected to the ring gear 120A of the fourth planetary gear set 120.

Figure 10:
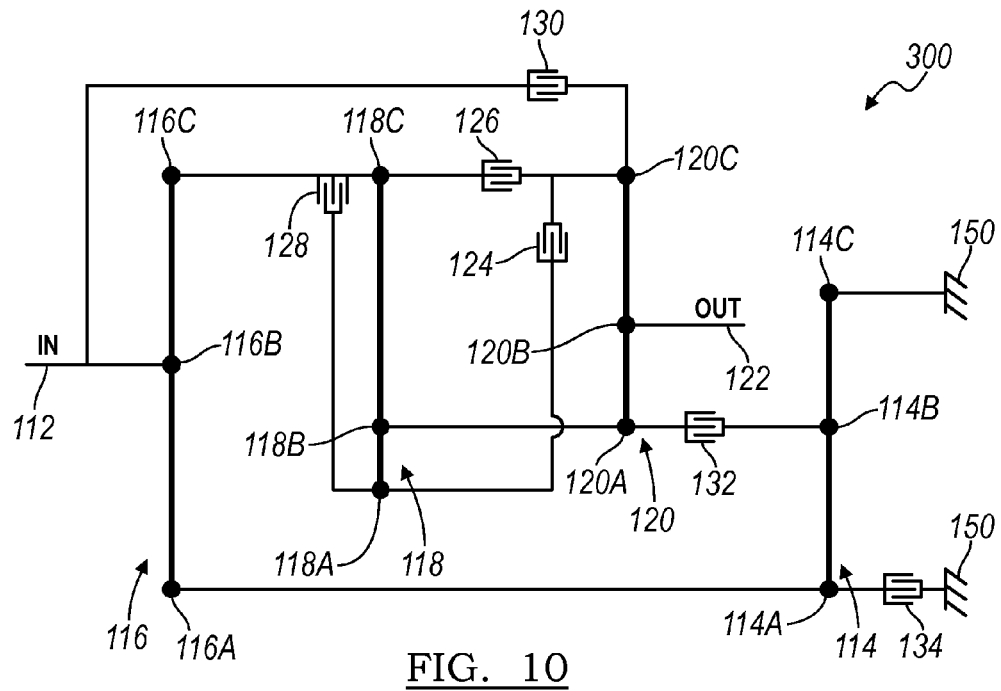
FIG. 10 is a lever diagram of an embodiment of a transmission according to the principles of present invention.

Referring now to FIG. 10, another embodiment of a multi-speed transmission 300 is illustrated in a lever diagram format. Transmission 300 has the same components and structural elements as transmission 100 as indicated by like reference numbers. However, transmission 300 has a different set of connections for third clutch 128. More specifically, the third clutch 128 is now selectively engageable to connect the first member 118A of the third planetary gear set 118 with the third member 116C of the second planetary gear set 116 and the third member 118C of the third planetary gear set 118. Moreover, the interconnecting shaft or member continuously connecting the second member 118B of the third planetary gear set 118 to the second member 120B of the fourth planetary gear set 120 is not present. However, a new connection is made fixedly connecting the second member 118B of the third planetary gear set 118 to the first member 120A of the fourth planetary gear set 120.

Figure 11:
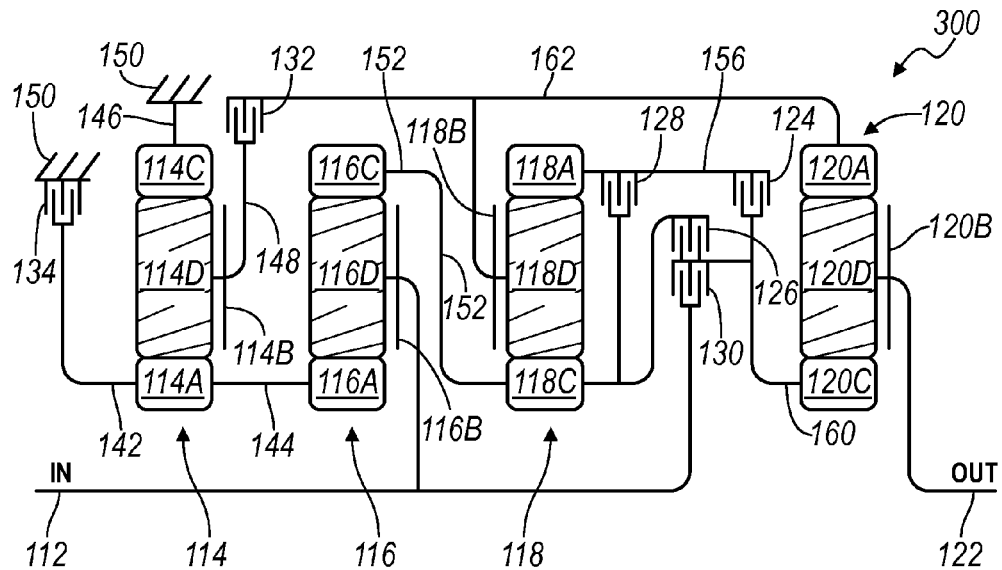
FIG. 11 is a diagrammatic illustration of a variation of the transmission of FIG. 10 according to the principles of the present invention.

Referring now to FIG. 11, a stick diagram presents a schematic layout of the embodiment of the multi-speed transmission 300 according to one form of the present invention. In accordance with the transmission 300 of FIG. 10, the interconnections of third clutch 128 are further illustrated. The third clutch 128 is now selectively engageable to connect the ring gear 118A of the third planetary gear set 118 with the ring gear 116C of the second planetary gear set 116 and sun gear 118C of the third planetary gear set 118. Moreover, the carrier member 118B of the second planetary gear set 118 is now continuously interconnected to the ring gear 120A of the fourth planetary gear set 120.

Figure 12:
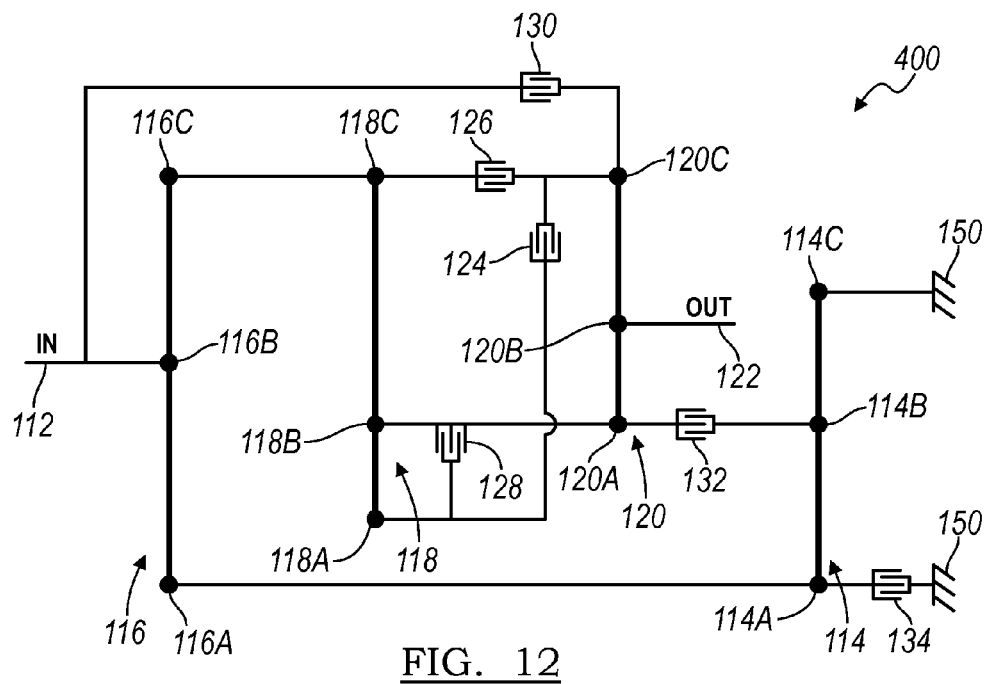
FIG. 12 is a lever diagram of an embodiment of a transmission according to the principles of present invention.

Referring now to FIG. 12, another embodiment of a multi-speed transmission 400 is illustrated in a lever diagram format. Transmission 400 has the same components and structural elements as transmission 100 as indicated by like reference numbers. However, transmission 400 has a different set of connections for third clutch 128. More specifically, the third clutch 128 is now selectively engageable to connect the first member 118A of the third planetary gear set 118 with the second member 118B of the third planetary gear set 118 and the first member 120A of the fourth planetary gear set 120. Moreover, the interconnecting shaft or member continuously connecting the second member 118B of the third planetary gear set 118 and the second member 120B of the fourth planetary gear set 120 is not present. However, a new connection is made fixedly connecting the second member 118B of the third planetary gear set 118 to the first member 120A of the fourth planetary gear set 120.

Figure 13:
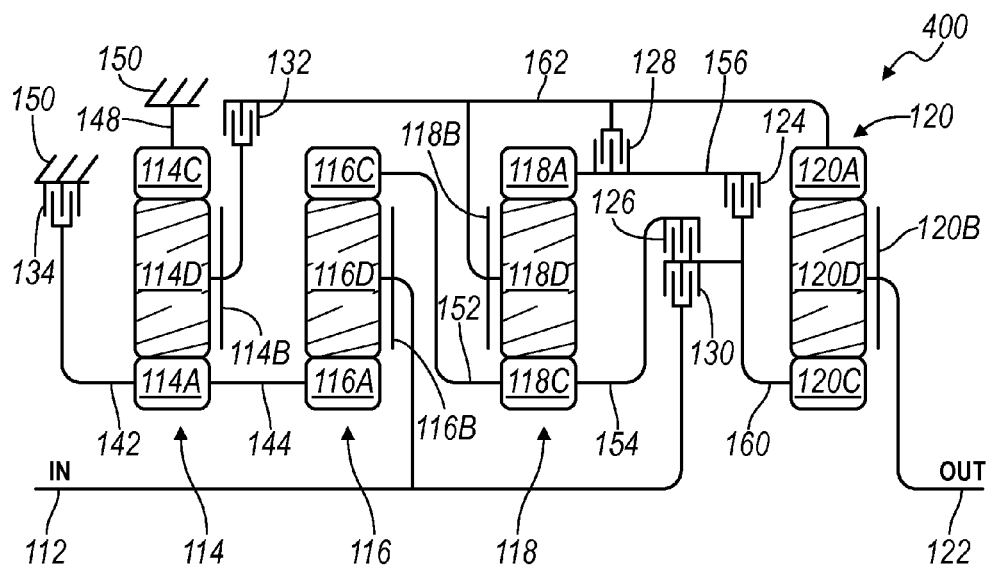
FIG. 13 is a diagrammatic illustration of a variation of the transmission of FIG. 12 according to the principles of the present invention.

Referring now to FIG. 13, a stick diagram presents a schematic layout of the embodiment of the multi-speed transmission 400 according to one form of the present invention. In accordance with the transmission 400 of FIG. 12, the interconnections of third clutch 128 are further illustrated. The third clutch 128 is now selectively engageable to connect the ring gear 118A of the third planetary gear set 118 with the ring gear 120A of the fourth planetary gear set 120. Moreover, the carrier member 118B of the third planetary gear set 118 is now continuously interconnected to the ring gear 120A of the fourth planetary gear set 120.

Figure 14:
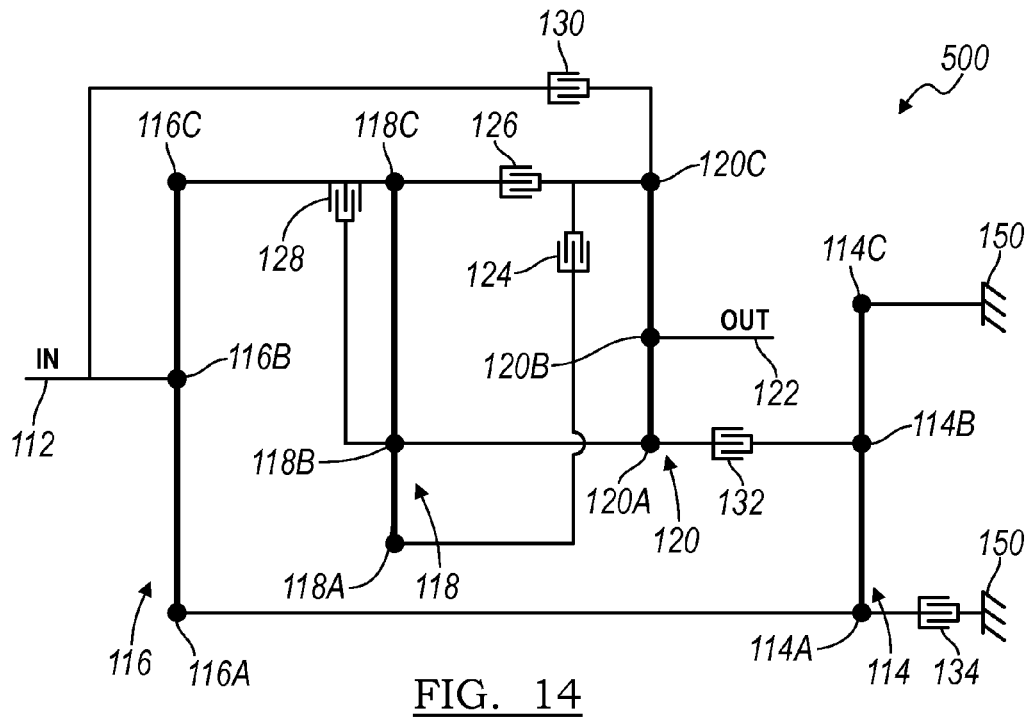
FIG. 14 is a lever diagram of an embodiment of a transmission according to the principles of present invention.

Referring now to FIG. 14, another embodiment of a multi-speed transmission 500 is illustrated in a lever diagram format. Transmission 500 has the same components and structural elements as transmission 100 as indicated by like reference numbers. However, transmission 500 has a different set of connections for third clutch 128. More specifically, the third clutch 128 is now selectively engageable to connect the third member 116C of the second planetary gear set 116 and the third member 118C of the third planetary gear set 118 with the second member 118B of the third planetary gear set 118 and the first member 120A of the fourth planetary gear set 120. Moreover, the interconnecting shaft or member continuously connecting the second member 118B of the third planetary gear set 118 and the second member 120B of the fourth planetary gear set 120 is not present. However, a new connection is made fixedly connecting the second member 118B of the third planetary gear set 118 to the first member 120A of the fourth planetary gear set 120.

Figure 15:
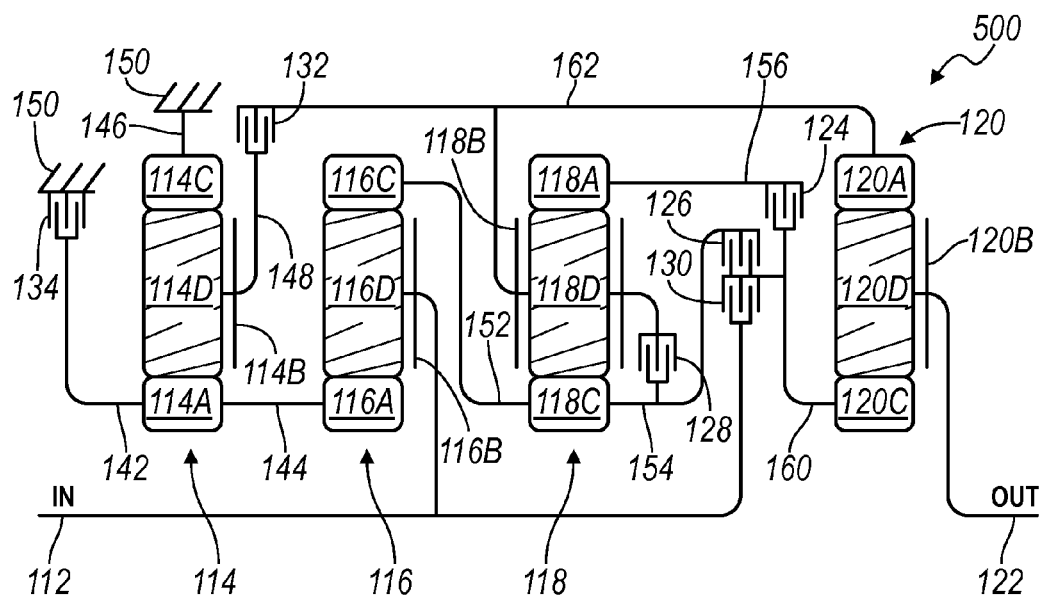
FIG. 15 is a diagrammatic illustration of a variation of the transmission of FIG. 14 according to the principles of the present invention.

Referring now to FIG. 15, a stick diagram presents a schematic layout of the embodiment of the multi-speed transmission 500 according to one form of the present invention. In accordance with the transmission 500 of FIG. 14, the interconnections of third clutch 128 are further illustrated. The third clutch 128 is now selectively engageable to connect the ring gear 116C of the second planetary gear set 116 and the sun gear 118C of the third planetary gear set 118 with carrier member 118B of the third planetary gear set 118 and the ring gear 120A of the fourth planetary gear set 120. Moreover, the carrier member 118B of the third planetary gear set 118 is now continuously interconnected to the ring gear 120A of the fourth planetary gear set 120.

Figure 16:
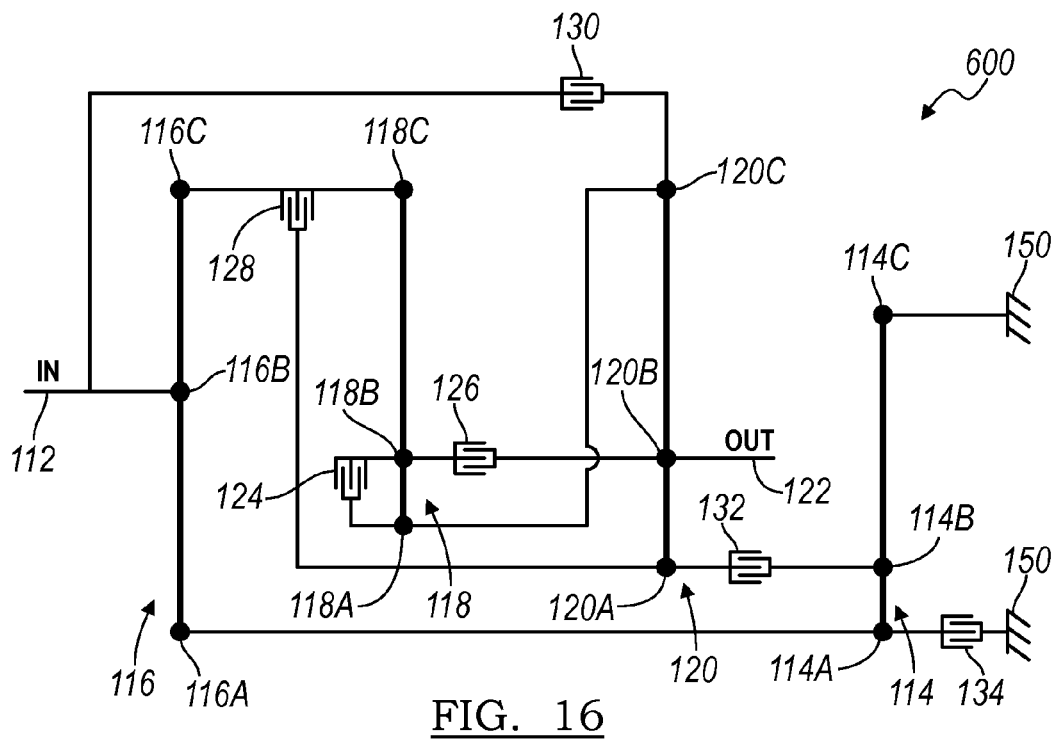
FIG. 16 is a lever diagram of an embodiment of a transmission according to the principles of present invention.

Referring now to FIG. 16, another embodiment of a multi-speed transmission 600 is illustrated in a lever diagram format. Transmission 600 has the same components and structural elements as transmission 100 as indicated by like reference numbers. However, transmission 600 has a different set of connections for first clutch 124 and second clutch 126. More specifically, the first clutch 124 is now selectively engageable to connect the first member 118A of the third planetary gear set 118 and the third member 120C of the fourth planetary gear set 120 with the second member 118B of the third planetary gear set 118. The second clutch 126 is now selectively engageable to connect the second member 118B of the third planetary gear set 118 with the second member 120B of the fourth planetary gear set 120. Moreover, the interconnecting shaft or member continuously connecting the second member 118B of the third planetary gear set 118 and the second member 120B of the fourth planetary gear set 120 is not present. However, a new connection is made fixedly connecting the first member 118A of the third planetary gear set 118 to the third member 120C of the fourth planetary gear set 120.

Figure 17:
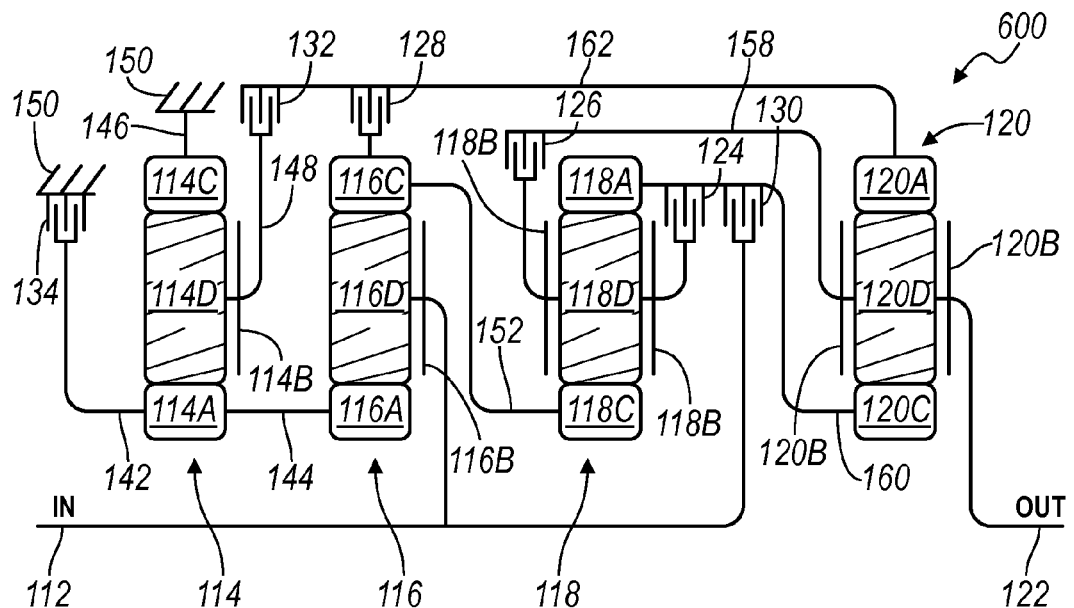
FIG. 17 is a diagrammatic illustration of a variation of the transmission of FIG. 16 according to the principles of the present invention.

Referring now to FIG. 17, a stick diagram presents a schematic layout of the embodiment of the multi-speed transmission 600 according to one form of the present invention. In accordance with the transmission 600 of FIG. 16, the interconnections of first clutch 124 and second clutch 126 are further illustrated. The first clutch 124 is now selectively engageable to connect the ring gear 118A of the third planetary gear set 118 and the sun gear 120C of the fourth planetary gear set 120 with carrier member 118B of the third planetary gear set 118. The second clutch 126 is now selectively engageable to connect the carrier member 118B of the third planetary gear set 118 with the carrier member 120B of the fourth planetary gear set 120. Moreover, ring gear 118A of the third planetary gear set 118 is now continuously interconnected to the sun gear 120C of the fourth planetary gear set 120.

Figure 18:
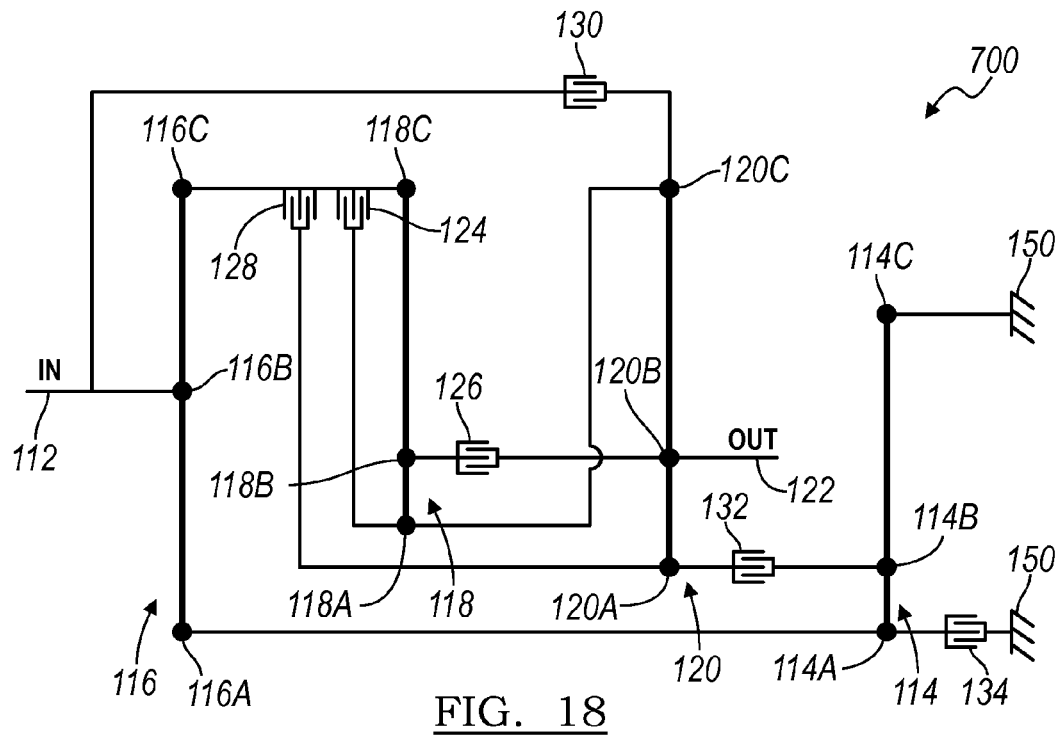
FIG. 18 is a lever diagram of an embodiment of a transmission according to the principles of present invention.

Referring now to FIG. 18, another embodiment of a multi-speed transmission 700 is illustrated in a lever diagram format. Transmission 700 has the same components and structural elements as transmission 100 as indicated by like reference numbers. However, transmission 700 has a different set of connections for first clutch 124 and second clutch 126. More specifically, the first clutch 124 is now selectively engageable to connect the third member 118C of the third planetary gear set 118 and the third member 116C of the second planetary gear set 116 with the first member 118A of the third planetary gear set 118 and the third member 120C of the fourth planetary gear set 120. The second clutch 126 is now selectively engageable to connect the second member 118B of the third planetary gear set 118 with the second member 120B of the fourth planetary gear set 120. Moreover, the interconnecting shaft or member continuously connecting the second member 118B of the third planetary gear set 118 and the second member 120B of the fourth planetary gear set 120 is not present. However, a new connection is made fixedly connecting the first member 118A of the third planetary gear set 118 to the third member 120C of the fourth planetary gear set 120.

Figure 19:
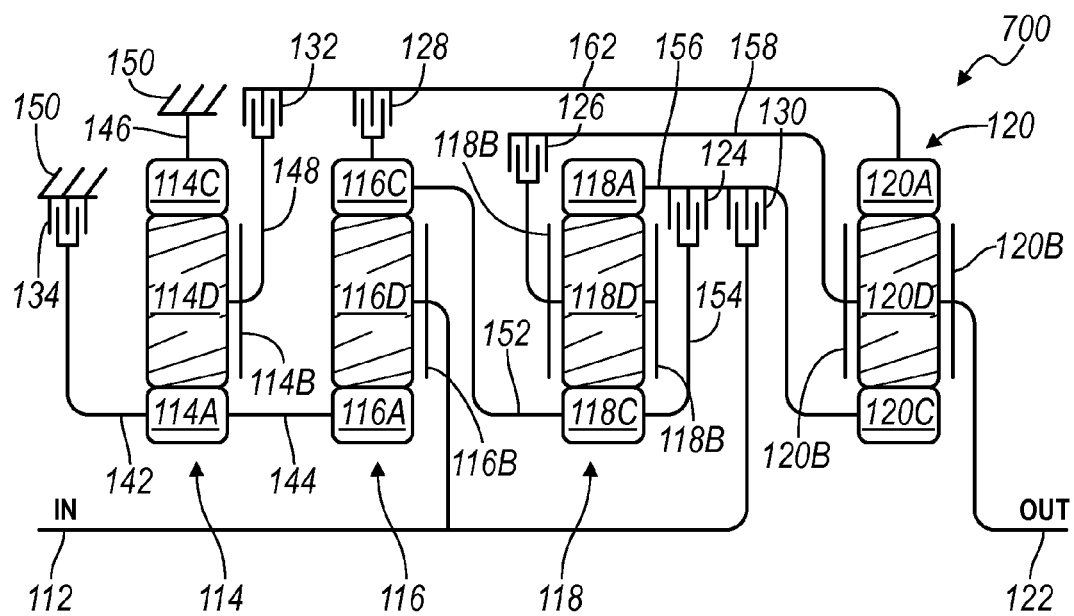
FIG. 19 is a diagrammatic illustration of a variation of the transmission of FIG. 18 according to the principles of the present invention.

Referring now to FIG. 19, a stick diagram presents a schematic layout of the embodiment of the multi-speed transmission 700 according to one form of the present invention. In accordance with the transmission 700 of FIG. 18, the interconnections of first clutch 124 and second clutch 126 are further illustrated. The first clutch 124 is now selectively engageable to connect the sun gear 118C of the third planetary gear set 118 and the ring gear 116C of the second planetary gear set 116 with the ring gear 118A of the third planetary gear set 118 and the sun gear 120C of the fourth planetary gear set 120. The second clutch 126 is now selectively engageable to connect the carrier member 118B of the third planetary gear set 118 with the carrier member 120B of the fourth planetary gear set 120. Moreover, ring gear 118A of the third planetary gear set 118 is now continuously interconnected to the sun gear 120C of the fourth planetary gear set 120.

Figure 20:
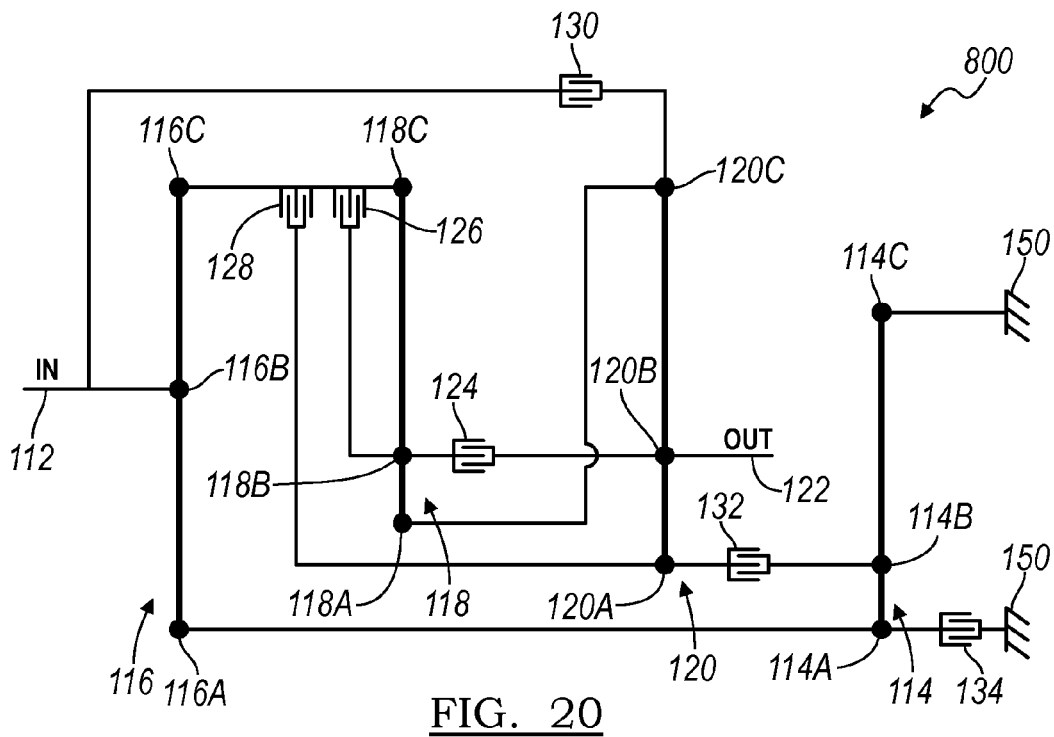
FIG. 20 is a lever diagram of an embodiment of a transmission according to the principles of present invention.

Referring now to FIG. 20, another embodiment of a multi-speed transmission 800 is illustrated in a lever diagram format. Transmission 800 has the same components and structural elements as transmission 100 as indicated by like reference numbers. However, transmission 800 has a different set of connections for first clutch 124 and second clutch 126. More specifically, the first clutch 124 is now selectively engageable to connect the second member 118B of the third planetary gear set 118 with the second member 120B of the fourth planetary gear set 120. The second clutch 126 is now selectively engageable to connect the second member 118B of the third planetary gear set 118 with the third member 116C of the second planetary gear set 116 and the third member 118C of the third planetary gear set 118. Moreover, the interconnecting shaft or member continuously connecting the second member 118B of the third planetary gear set 118 and the second member 120B of the fourth planetary gear set 120 is not present. However, a new connection is made fixedly connecting the first member 118A of the third planetary gear set 118 to the third member 120C of the fourth planetary gear set 120.

Figure 21:
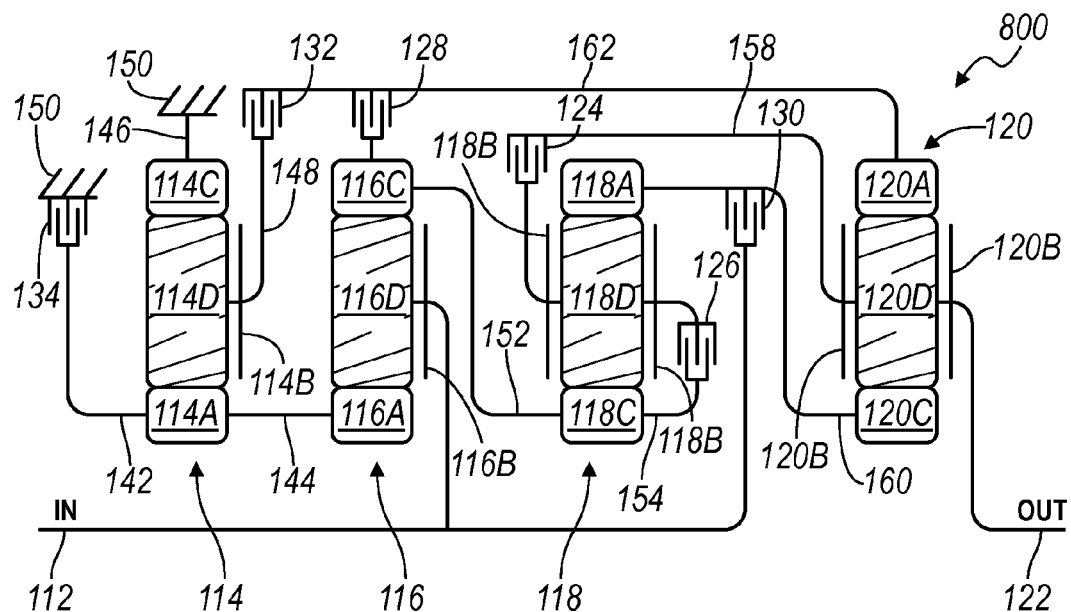
FIG. 21 is a diagrammatic illustration of a variation of the transmission of FIG. 20 according to the principles of the present invention.

Referring now to FIG. 21, a stick diagram presents a schematic layout of the embodiment of the multi-speed transmission 800 according to one form of the present invention. In accordance with the transmission 800 of FIG. 20, the interconnections of first clutch 124 and second clutch 126 are further illustrated. The first clutch 124 is now selectively engageable to connect the carrier member 118B of the third planetary gear set 118 with the carrier member 120B of the fourth planetary gear set 120. The second clutch 126 is now selectively engageable to connect the carrier member 118B of the third planetary gear set 118 with sun gear 118C of the third planetary gear set 118. Moreover, ring gear 118A of the third planetary gear set 118 is now continuously interconnected to the sun gear 120C of the fourth planetary gear set 120.

Figure 22:
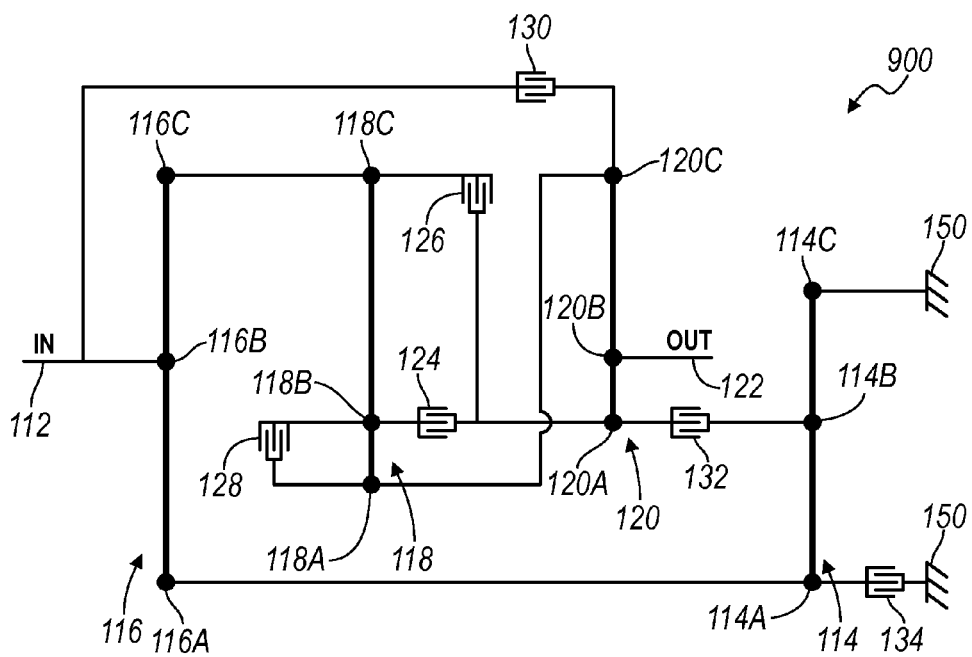
FIG. 22 is a lever diagram of an embodiment of a transmission according to the principles of present invention.

Referring now to FIG. 22, another embodiment of a multi-speed transmission 900 is illustrated in a lever diagram format. Transmission 900 has the same components and structural elements as transmission 100 as indicated by like reference numbers. However, transmission 900 has a different set of connections for first clutch 124, second clutch 126 and third clutch 128. More specifically, the first clutch 124 is now selectively engageable to connect the second member 118B of the third planetary gear set 118 with the first member 120A of the fourth planetary gear set 120. The second clutch 126 is now selectively engageable to connect the third member 116C of the third planetary gear set 116 and the third member 118C of the third planetary gear set 118 with the first member 120A of the fourth planetary gear set 120. The third clutch 128 is now selectively engageable to connect the second member 118B of the third planetary gear set 118 with the first member 118A of the third planetary gear set 118 and the third member 120C of the fourth planetary gear set 120. Moreover, the interconnecting shaft or member continuously connecting the second member 118B of the third planetary gear set 118 with the second member 120B of the fourth planetary gear set 120 is not present. However, a new connection is made fixedly connecting the first member 118A of the third planetary gear set 118 to the third member 120C of the fourth planetary gear set 120.

Figure 23:
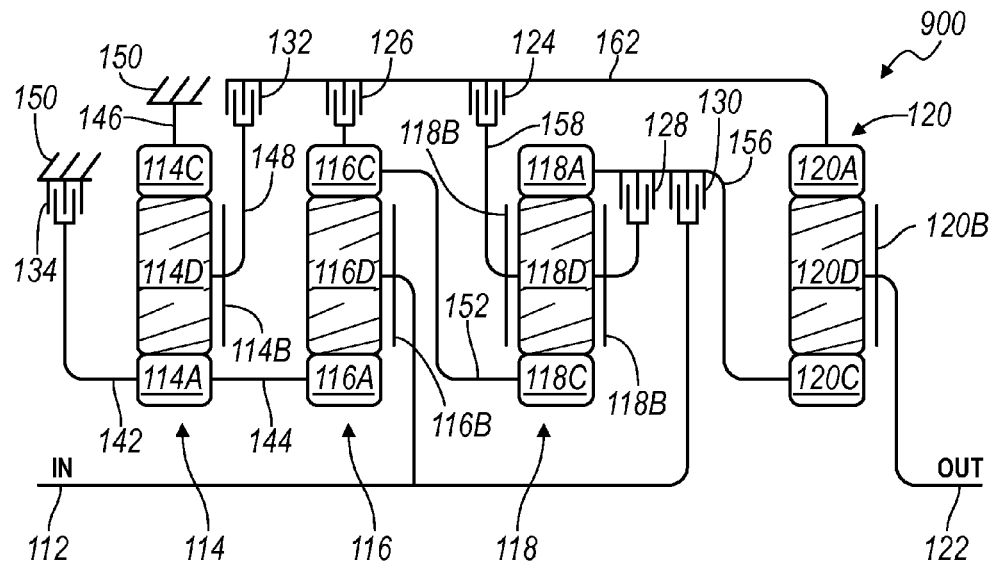
FIG. 23 is a diagrammatic illustration of a variation of the transmission of FIG. 22 according to the principles of the present invention.

Referring now to FIG. 23, a stick diagram presents a schematic layout of the embodiment of the multi-speed transmission 900 according to one form of the present invention. In accordance with the transmission 900 of FIG. 22, the interconnections of first clutch 124, second clutch 126 and third clutch 128 are further illustrated. The first clutch 124 is now selectively engageable to connect the carrier member 118B of the third planetary gear set 118 with the ring gear 120A of the fourth planetary gear set 120. The second clutch 126 is now selectively engageable to connect the ring gear 116C of the second planetary gear set 116 and the sun gear 118C of the third planetary gear set 118 with the ring gear 120A of the fourth planetary gear set 120. The third clutch 128 is now selectively engageable to connect the carrier member 118B of the third planetary gear set 118 with the ring gear 118A of the third planetary gear set 118 and the sun gear 120C of the fourth planetary gear set 120. Moreover, ring gear 118A of the third planetary gear set 118 is now continuously interconnected to the sun gear 120C of the fourth planetary gear set 120.

Figure 24:
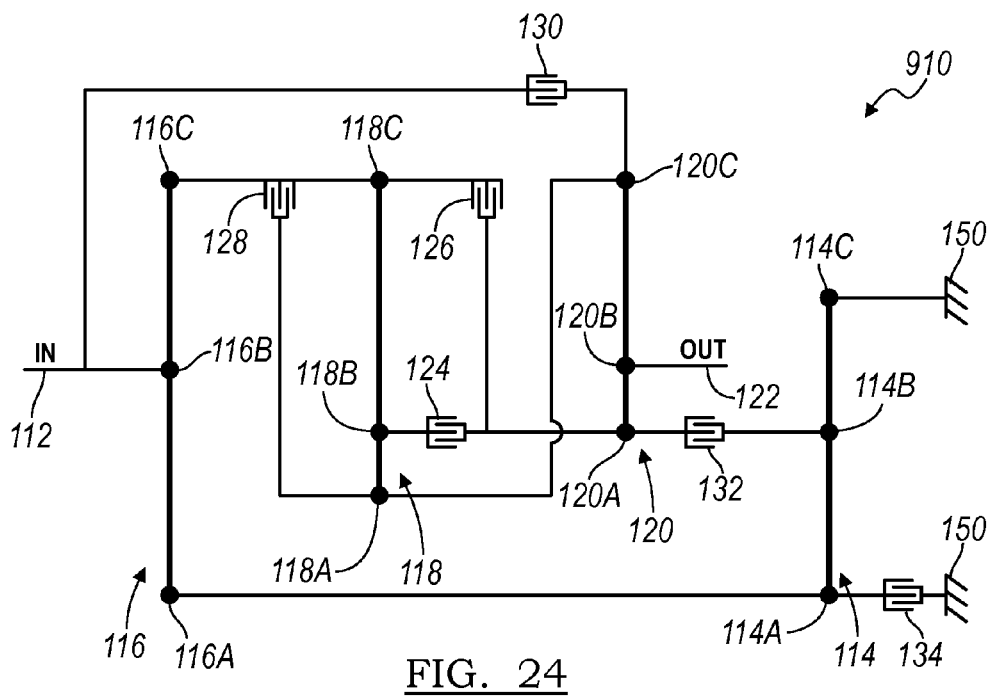
FIG. 24 is a lever diagram of an embodiment of a transmission according to the principles of present invention.

Referring now to FIG. 24, another embodiment of a multi-speed transmission 910 is illustrated in a lever diagram format. Transmission 910 has the same components and structural elements as transmission 100 as indicated by like reference numbers. However, transmission 910 has a different set of connections for first clutch 124 and second clutch 126 and third clutch 128. More specifically, the first clutch 124 is now selectively engageable to connect the second member 118B of the third planetary gear set 118 with the first member 120A of the fourth planetary gear set 120. The second clutch 126 is now selectively engageable to connect the third member 116C of the second planetary gear set 116 and the third member 118C of the third planetary gear set 118 with the first member 120A of the fourth planetary gear set 120. The third clutch 128 is now selectively engageable to connect the third member 116C of the second planetary gear set 116 and the third member 118C of the third planetary gear set 118 with the first member 118A of the third planetary gear set 118 and the third member 120C of the fourth planetary gear set 120. Moreover, the interconnecting shaft or member continuously connecting the second member 118B of the third planetary gear set 118 with the second member 120B of the fourth planetary gear set 120 is not present. However, a new connection is made fixedly connecting the first member 118A of the third planetary gear set 118 to the third member 120C of the fourth planetary gear set 120.

Figure 25:
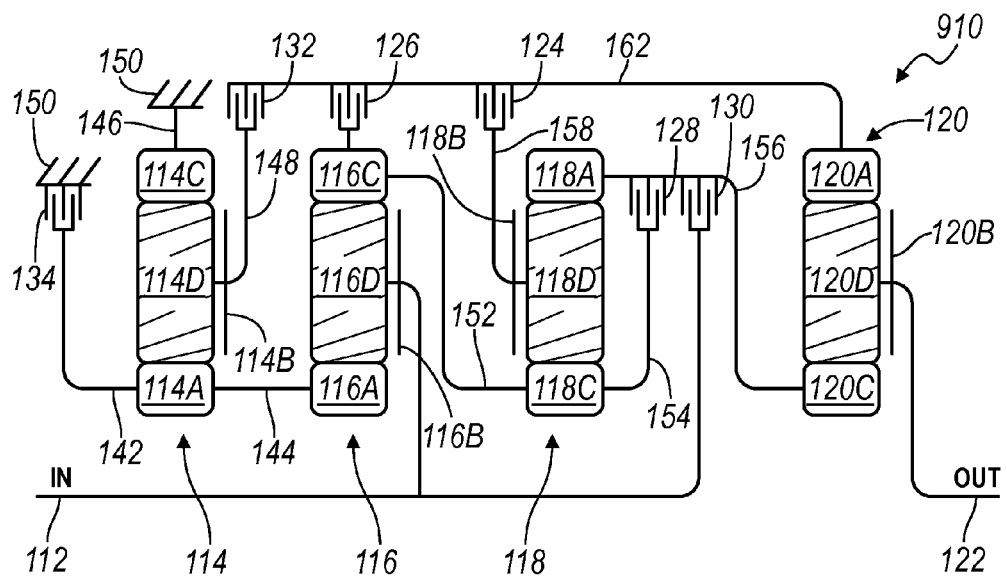
FIG. 25 is a diagrammatic illustration of a variation of the transmission of FIG. 24 according to the principles of the present invention.

Referring now to FIG. 25, a stick diagram presents a schematic layout of the embodiment of the multi-speed transmission 910 according to one form of the present invention. In accordance with the transmission 910 of FIG. 24, the interconnections of first clutch 124, second clutch 126 and third clutch 128 are further illustrated. The first clutch 124 is now selectively engageable to connect the carrier member 118B of the third planetary gear set 118 with the ring gear 120A of the fourth planetary gear set 120. The second clutch 126 is now selectively engageable to connect the ring gear 116C of the second planetary gear set 116 and the sun gear 118C of the third planetary gear set 118 with the ring gear 120A of the fourth planetary gear set 120. The third clutch 128 is now selectively engageable to connect the ring gear 116C of the second planetary gear set 116 and the sun gear 118C of the third planetary gear set 118 with the ring gear 118A of the third planetary gear set 118 and the sun gear 120C of the fourth planetary gear set 120. Moreover, ring gear 118A of the third planetary gear set 118 is now continuously interconnected to the sun gear 120C of the fourth planetary gear set 120.

Figure 26:
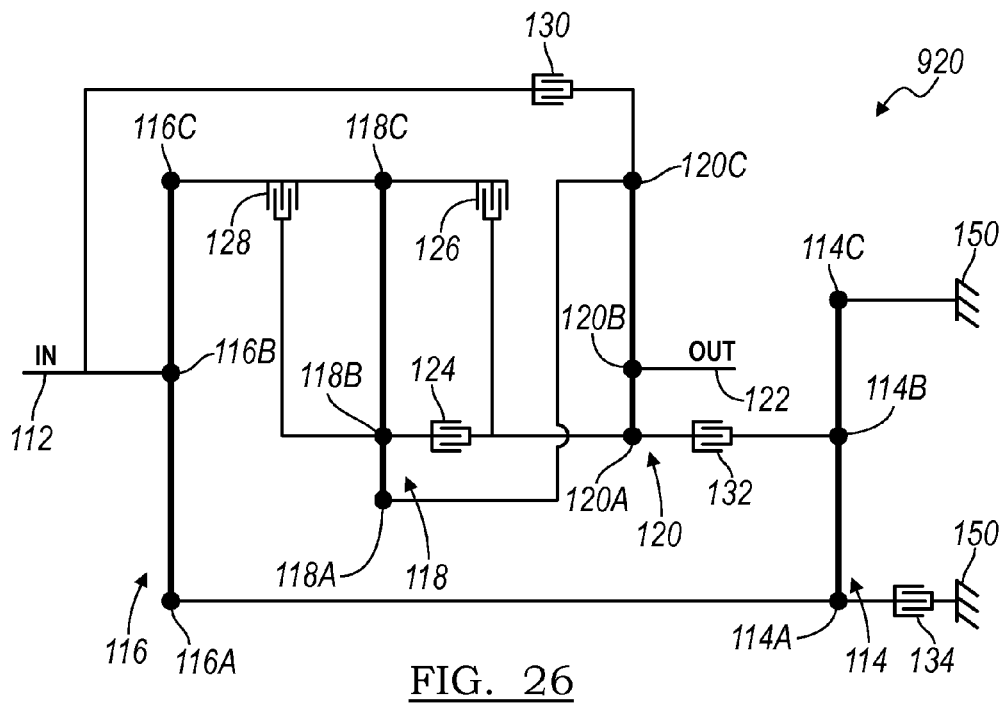
FIG. 26 is a lever diagram of an embodiment of a transmission according to the principles of present invention.

Referring now to FIG. 26, another embodiment of a multi-speed transmission 920 is illustrated in a lever diagram format. Transmission 920 has the same components and structural elements as transmission 100 as indicated by like reference numbers. However, transmission 920 has a different set of connections for first clutch 124 and second clutch 126 and third clutch 128. More specifically, the first clutch 124 is now selectively engageable to connect the second member 118B of the third planetary gear set 118 with the first member 120A of the fourth planetary gear set 120. The second clutch 126 is now selectively engageable to connect the third member 116C of the second planetary gear set 116 and the third member 118C of the third planetary gear set 118 with the first member 120A of the fourth planetary gear set 120. The third clutch 128 is now selectively engageable to connect the third member 116C of the second planetary gear set 116 and the third member 118C of the third planetary gear set 118 with the second member 118B of the third planetary gear set 118. Moreover, the interconnecting shaft or member continuously connecting the second member 118B of the third planetary gear set 118 with the second member 120B of the fourth planetary gear set 120 is not present. However, a new connection is made fixedly connecting the first member 118A of the third planetary gear set 118 to the third member 120C of the fourth planetary gear set 120.

Figure 27:
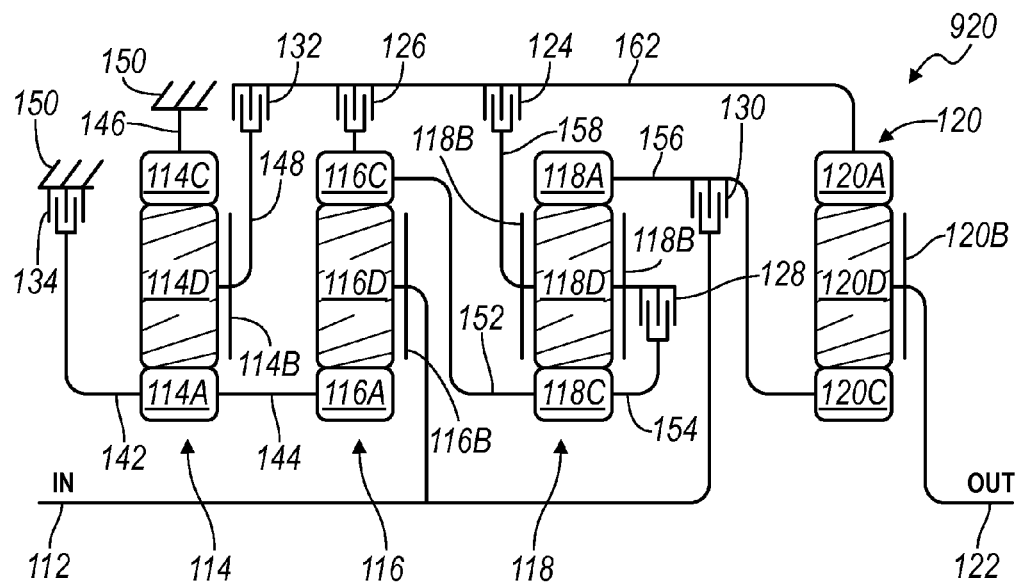
FIG. 27 is a diagrammatic illustration of a variation of the transmission of FIG. 26 according to the principles of the present invention.

Referring now to FIG. 27, a stick diagram presents a schematic layout of the embodiment of the multi-speed transmission 920 according to one form of the present invention. In accordance with the transmission 920 of FIG. 26, the interconnections of first clutch 124, second clutch 126 and third clutch 128 are further illustrated. The first clutch 124 is now selectively engageable to connect the carrier member 118B of the third planetary gear set 118 with the ring gear 120A of the fourth planetary gear set 120. The second clutch 126 is now selectively engageable to connect the ring gear 116C of the second planetary gear set 116 and the sun gear 118C of the third planetary gear set 118 with the ring gear 120A of the fourth planetary gear set 120. The third clutch 128 is now selectively engageable to connect the ring gear 116C of the second planetary gear set 116 and the sun gear 118C of the third planetary gear set 118 with the carrier member gear 118B of the third planetary gear set 118. Moreover, ring gear 118A of the third planetary gear set 118 is now continuously interconnected to the sun gear 120C of the fourth planetary gear set 120.

Figures 28, 29:
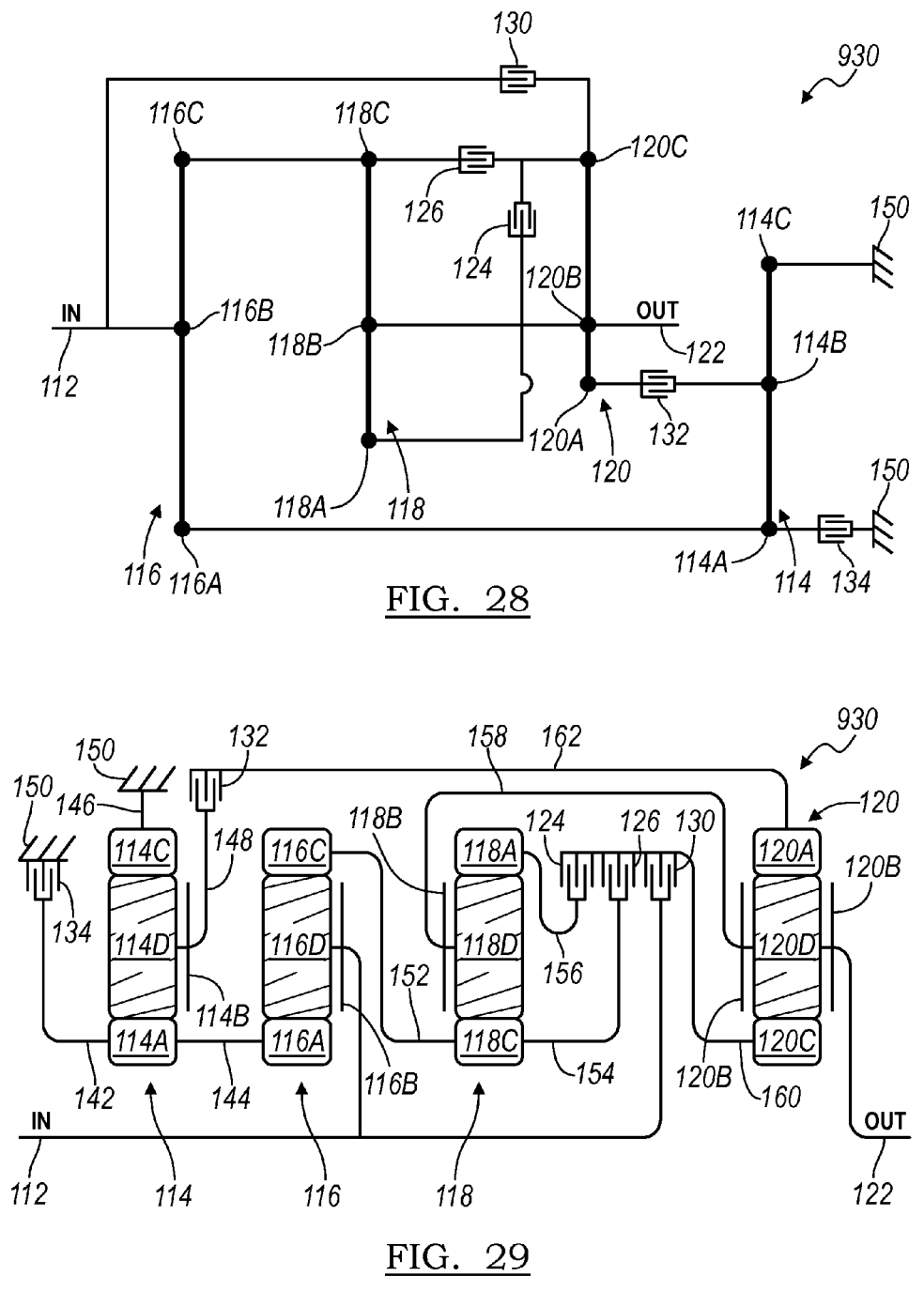

Referring now to FIG. 28, another embodiment of a multi-speed transmission 930 is illustrated in a lever diagram format. Transmission 930 has the same components and structural elements as transmission 100 as indicated by like reference numbers. However, transmission 930 does not include third clutch 128. Therefore, transmission 930 has four clutches and one brake (first clutch 124, second clutch 126, fourth clutch 130, fifth clutch 132 and brake 134).

Referring now to FIG. 29, a stick diagram presents a schematic layout of the embodiment of the multi-speed transmission 930 according to one form of the present invention. In accordance with the transmission 930 of FIG. 28, the interconnections of first clutch 124, second clutch 126, fourth clutch 130, fifth clutch 132 and brake 134 are further illustrated. As shown in FIG. 29, transmission 930 does not include third clutch 128.

Referring now to FIGS. 6-30 and 31, the operation of the multi-speed transmissions 100, 200, 300, 400, 500, 600, 700, 800, 900, 910, 920 and 930 will be described. It will be appreciated that transmissions 100, 200, 300, 400, 500, 600, 700, 800, 900, 910, 920 and 930 are capable of transmitting torque from the input shaft or member 112 to the output shaft or member 122 in multiple forward speed torque ratios and at least one reverse speed or torque ratio. Each forward and reverse speed or torque ratio is attained by engagement of one or more of the torque-transmitting mechanisms (i.e. first clutch 124, second clutch 126, third clutch 128, fourth clutch 130, fifth clutch 132 and brake 134), as will be explained below.

FIGS. 30 and 31 are truth tables presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmissions. Of course, other gear ratios are achievable depending on the gear diameter, gear teeth count and gear configuration selected.

Referring now to FIG. 30, FIG. 30 illustrates the combination of torque-transmitting mechanism engagement to achieve the various gear states of transmission 930 shown in FIGS. 28 and 29. For example, a reverse gear is established by engaging or activating the first clutch 124, the fifth clutch 132 and the brake 134. The first clutch 124 connects the ring gear 118A of the third planetary gear set 118 with the sun gear 120C of the fourth planetary gear set 120. The fifth clutch 132 connects the carrier member 114B of the first planetary gear set 114 with the ring gear 120A of the fourth planetary gear set 120. The brake 134 connects the sun gear 114A of the first planetary gear set 114 with the stationary element or the transmission housing 150 in order to restrict the sun gear 114A from rotating relative to the transmission housing 150, which also restricts the sun gear 116A from rotating relative to the transmission housing 150. Likewise, the forward ratios are achieved through different combinations of clutch and brake engagement, as shown in FIG. 30, by way of example.

Referring now to FIG. 31, FIG. 31 illustrates the combination of torque-transmitting mechanism engagement to achieve the various gear states of transmissions 100, 200, 300, 400, 500, 600, 700, 800, 900, 910 and 920 shown in FIGS. 6 through 27. For example, with respect to transmission 100, a reverse gear is established by engaging or activating the first clutch 124, the fifth clutch 132 and the brake 134. The first clutch 124 connects the ring gear 118A of the third planetary gear set 118 with the sun gear 120C of the fourth planetary gear set 120. The fifth clutch 132 connects the carrier member 114B of the first planetary gear set 114 with the ring gear 120A of the fourth planetary gear set 120. The brake 134 connects the sun gear 114A of the first planetary gear set 114 with the stationary element or the transmission housing 150 in order to restrict the sun gear 114A from rotating relative to the transmission housing 150, which also restricts the sun gear 116A from rotating relative to the transmission housing 150. Likewise, the forward ratios are achieved through different combinations of clutch and brake engagement, as shown in FIG. 31, by way of example. Moreover, FIG. 31 shows three different clutch and brake engagement combinations contemplated by the present invention for achieving fourth gear, three different clutch and brake engagement combinations for achieving seventh gear and three different clutch and brake engagement combinations for achieving tenth gear.

Figure 32:
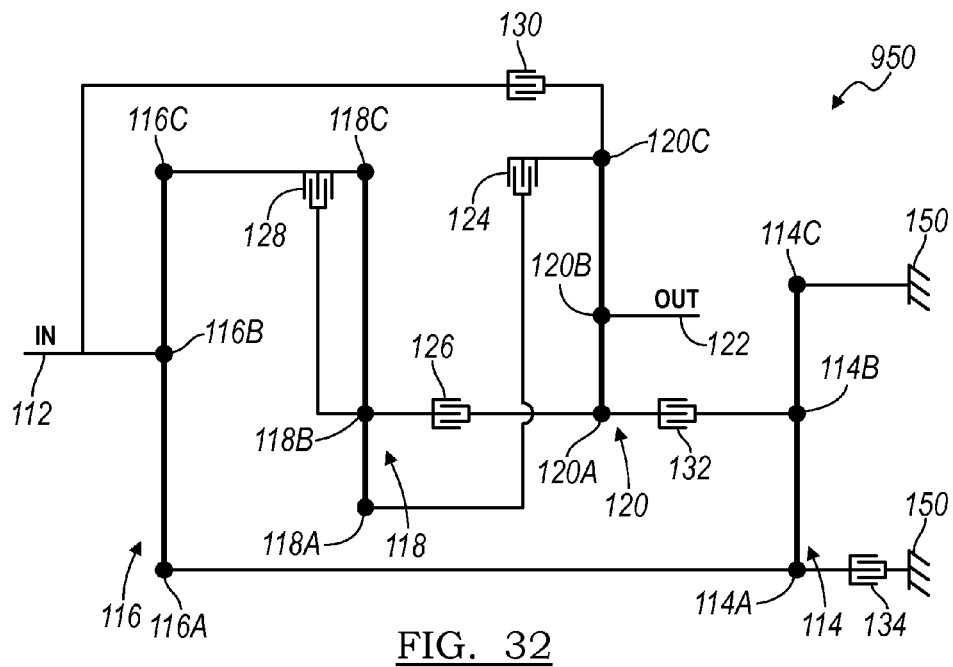
FIG. 32 is a lever diagram of an embodiment of a transmission according to the principles of present invention.

Referring now to FIG. 32, another embodiment of a multi-speed transmission 950 is illustrated in a lever diagram format. Transmission 950 has the same components and structural elements as transmission 100 as indicated by like reference numbers. However, transmission 950 has a different set of connections for second clutch 126 and third clutch 128. More specifically, the second clutch 126 is now selectively engageable to connect the second member 118B of the third planetary gear set 118 with the first member 120A of the fourth planetary gear set 120. The third clutch 128 is now selectively engageable to connect the third member 116C of the second planetary gear set 116 and the third member 118C of the third planetary gear set 118 with the second member 118B of the third planetary gear set 118. Moreover, the interconnecting shaft or member continuously connecting the second member 118B of the third planetary gear set 118 with the second member 120B of the fourth planetary gear set 120 is not present.

Figure 33:
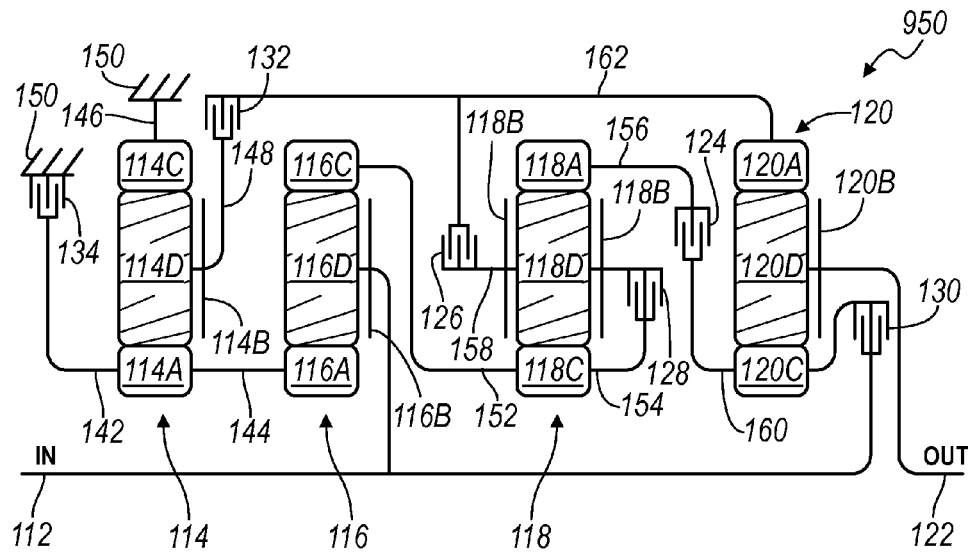
FIG. 33 is a diagrammatic illustration of a variation of the transmission of FIG. 32 according to the principles of the present invention.

Referring now to FIG. 33, a stick diagram presents a schematic layout of the embodiment of the multi-speed transmission 950 according to one form of the present invention. In accordance with the transmission 950 of FIG. 32, the interconnections of second clutch 126 and third clutch 128 are further illustrated. The second clutch 126 is now selectively engageable to connect the carrier member 118B of the third planetary gear set 118 with the ring gear 120A of the fourth planetary gear set 120. The third clutch 128 is now selectively engageable to connect the ring gear 116C of the second planetary gear set 116 and the sun gear 118C of the third planetary gear set 118 with the carrier member gear 118B of the third planetary gear set 118.

Figure 34:
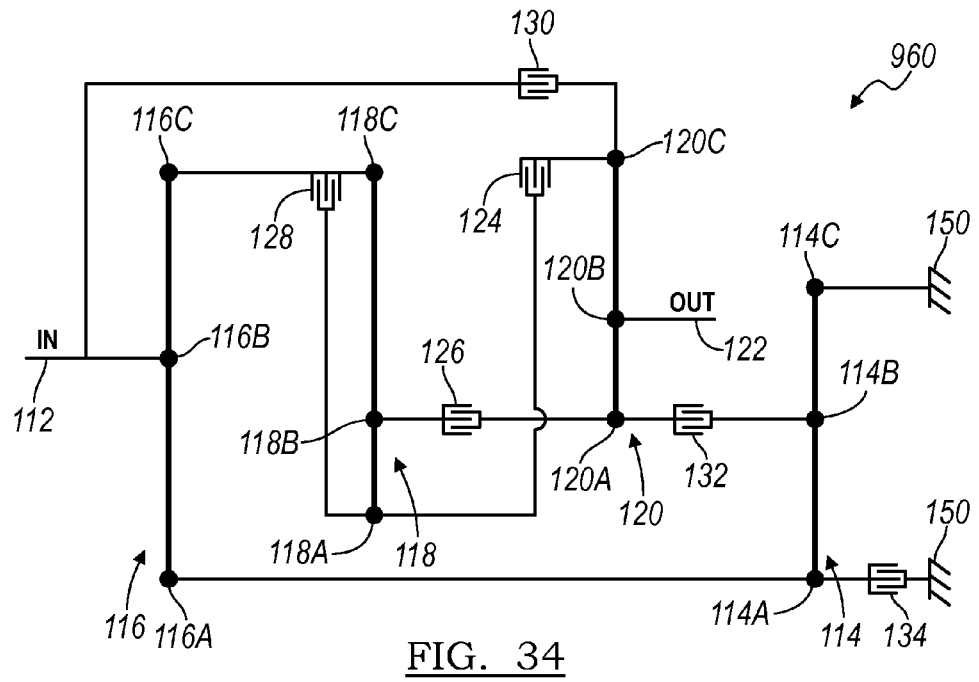
FIG. 34 is a lever diagram of an embodiment of a transmission according to the principles of present invention.

Referring now to FIG. 34, another embodiment of a multi-speed transmission 960 is illustrated in a lever diagram format. Transmission 960 has the same components and structural elements as transmission 100 as indicated by like reference numbers. However, transmission 960 has a different set of connections for second clutch 126 and third clutch 128. More specifically, the second clutch 126 is now selectively engageable to connect the second member 118B of the third planetary gear set 118 with the first member 120A of the fourth planetary gear set 120. The third clutch 128 is now selectively engageable to connect the third member 116C of the second planetary gear set 116 and the third member 118C of the third planetary gear set 118 with the first member 118A of the third planetary gear set 118. Moreover, the interconnecting shaft or member continuously connecting the second member 118B of the third planetary gear set 118 with the second member 120B of the fourth planetary gear set 120 is not present.

Figure 35:
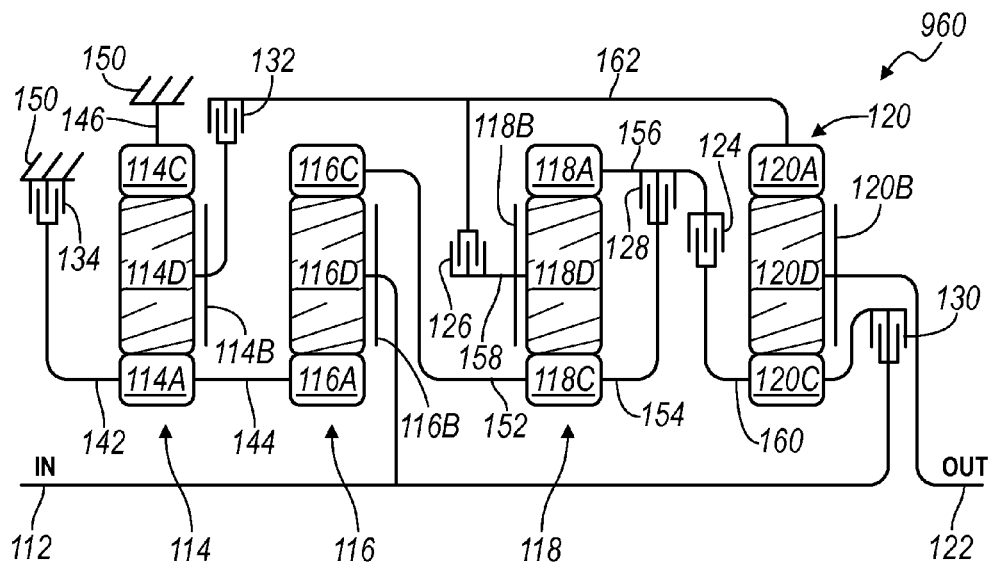
FIG. 35 is a diagrammatic illustration of a variation of the transmission of FIG. 34 according to the principles of the present invention.

Referring now to FIG. 35, a stick diagram presents a schematic layout of the embodiment of the multi-speed transmission 960 according to one form of the present invention. In accordance with the transmission 960 of FIG. 34, the interconnections of second clutch 126 and third clutch 128 are further illustrated. The second clutch 126 is now selectively engageable to connect the carrier member 118B of the third planetary gear set 118 with the ring gear 120A of the fourth planetary gear set 120. The third clutch 128 is now selectively engageable to connect the ring gear 116C of the second planetary gear set 116 and the sun gear 118C of the third planetary gear set 118 with the ring gear 118A of the third planetary gear set 118.

Figure 36:
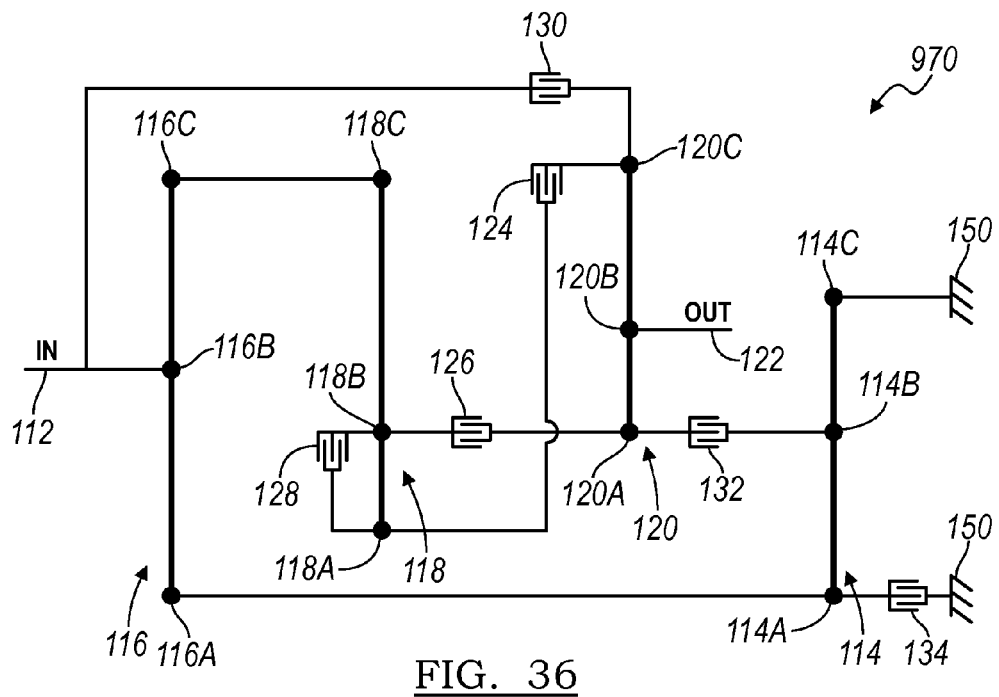
FIG. 36 is a lever diagram of an embodiment of a transmission according to the principles of present invention.

Referring now to FIG. 36, another embodiment of a multi-speed transmission 970 is illustrated in a lever diagram format. Transmission 970 has the same components and structural elements as transmission 100 as indicated by like reference numbers. However, transmission 970 has a different set of connections for second clutch 126 and third clutch 128. More specifically, the second clutch 126 is now selectively engageable to connect the second member 118B of the third planetary gear set 118 with the first member 120A of the fourth planetary gear set 120. The third clutch 128 is now selectively engageable to connect the second member 118B of the third planetary gear set 118 with the first member 118A of the third planetary gear set 118. Moreover, the interconnecting shaft or member continuously connecting the second member 118B of the third planetary gear set 118 with the second member 120B of the fourth planetary gear set 120 is not present.

Figure 37:
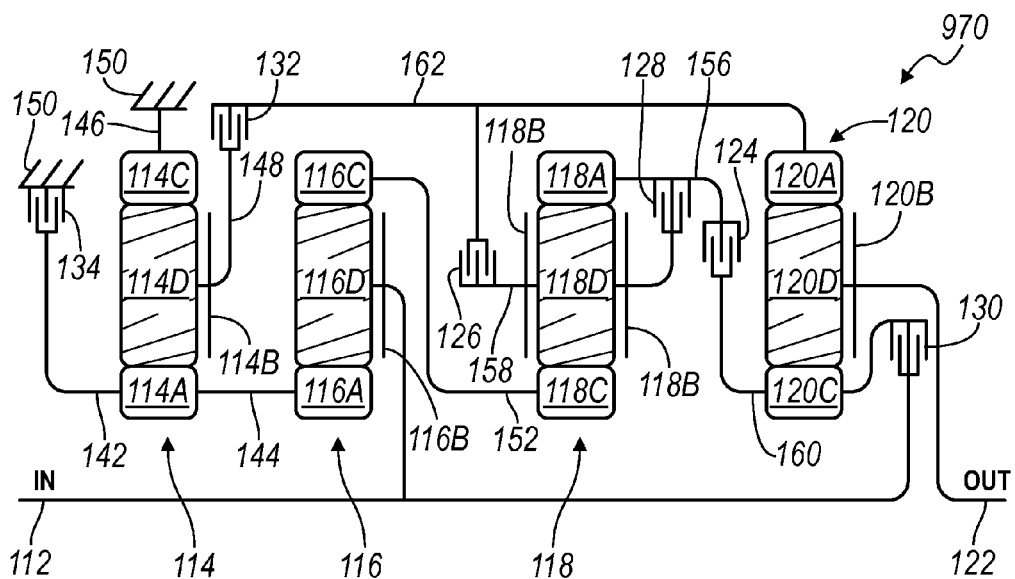
FIG. 37 is a diagrammatic illustration of a variation of the transmission of FIG. 36 according to the principles of the present invention.

Referring now to FIG. 37, a stick diagram presents a schematic layout of the embodiment of the multi-speed transmission 970 according to one form of the present invention. In accordance with the transmission 970 of FIG. 36, the interconnections of second clutch 126 and third clutch 128 are further illustrated. The second clutch 126 is now selectively engageable to connect the carrier member 118B of the third planetary gear set 118 with the ring gear 120A of the fourth planetary gear set 120. The third clutch 128 is now selectively engageable to connect the carrier member 118B of the third planetary gear set 118 with the ring gear 118A of the third planetary gear set 118.

Figure 38:
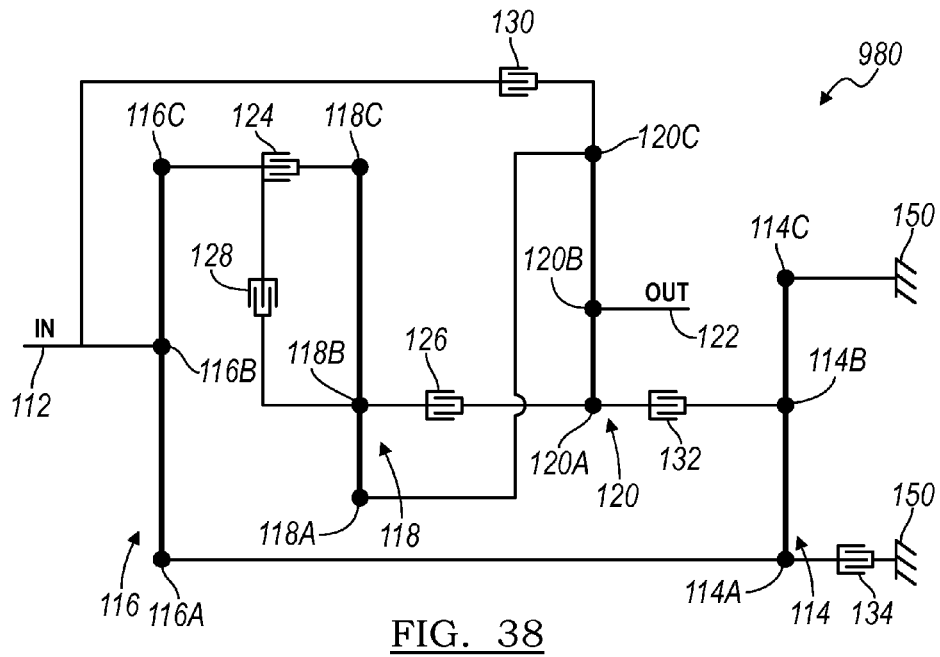
FIG. 38 is a lever diagram of an embodiment of a transmission according to the principles of present invention.

Referring now to FIG. 38, another embodiment of a multi-speed transmission 980 is illustrated in a lever diagram format. Transmission 980 has the same components and structural elements as transmission 100 as indicated by like reference numbers. However, transmission 980 has a different set of connections for first clutch 124, second clutch 126 and third clutch 128. More specifically, the first clutch 124 is now selectively engageable to connect the third member 116C of the second planetary gear set 116 with the third member 118C of the third planetary gear set 118. The second clutch 126 is now selectively engageable to connect the second member 118B of the third planetary gear set 118 with the first member 120A of the fourth planetary gear set 120. The third clutch 128 is now selectively engageable to connect the third member 116C of the second planetary gear set 116 with the second member 118B of the third planetary gear set 118. Moreover, the interconnecting shaft or member continuously connecting the second member 118B of the third planetary gear set 118 with the second member 120B of the fourth planetary gear set 120 is not present. However, a new connection is made fixedly connecting the first member 118A of the third planetary gear set 118 to the third member 120C of the fourth planetary gear set 120.

Figure 39:
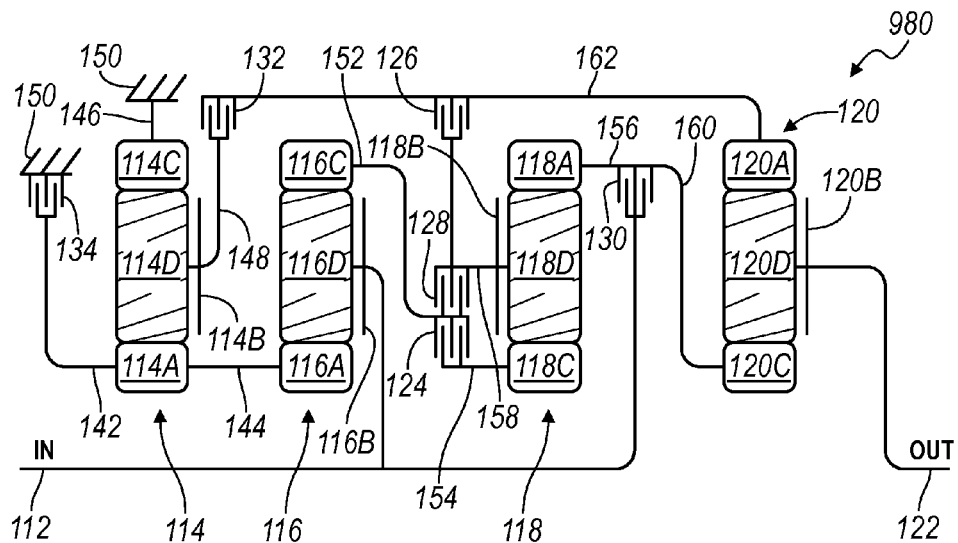
FIG. 39 is a diagrammatic illustration of a variation of the transmission of FIG. 38 according to the principles of the present invention.

Referring now to FIG. 39, a stick diagram presents a schematic layout of the embodiment of the multi-speed transmission 980 according to one form of the present invention. In accordance with the transmission 980 of FIG. 37, the interconnections of first clutch 124, second clutch 126 and third clutch 128 are further illustrated. The first clutch 124 is now selectively engageable to connect the ring gear 116C of the second planetary gear set 116 with the sun gear 118C of the third planetary gear set 118. The second clutch 126 is now selectively engageable to connect the carrier member 118B of the third planetary gear set 118 with the ring gear 120A of the fourth planetary gear set 120. The third clutch 128 is now selectively engageable to connect the ring gear 116C of the second planetary gear set 116 with the carrier member 118B of the third planetary gear set 118. Moreover, ring gear 118A of the third planetary gear set 118 is now continuously interconnected to the sun gear 120C of the fourth planetary gear set 120.

Referring now to FIG. 40, FIG. 40 illustrates the combination of torque-transmitting mechanism engagement to achieve the various gear states of transmissions 950, 960, 970 and 980 shown in FIGS. 32 through 39. For example, with respect to transmission 950, a reverse gear is established by engaging or activating the second clutch 126, the third clutch 128, the fifth clutch 132 and the brake 134. The second clutch 126 connects the carrier member 118B of the third planetary gear set 118 with the ring gear 120A of the fourth planetary gear set 120. The third clutch 128 connects the carrier member 118B of the third planetary gear set 118 with sun gear 118C of the third planetary gear set 118 and the ring gear 116C of the second planetary gear set 116. The fifth clutch 132 connects the carrier member 114B of the first planetary gear set 114 with the ring gear 120A of the fourth planetary gear set 120. The brake 134 connects the sun gear 114A of the first planetary gear set 114 with the stationary element or the transmission housing 150 in order to restrict the sun gear 114A from rotating relative to the transmission housing 150, which also restricts the sun gear 116A from rotating relative to the transmission housing 150. Likewise, the forward ratios are achieved through different combinations of clutch and brake engagement, as shown in FIG. 40, by way of example. Moreover, FIG. 40 shows four different clutch and brake engagement combinations contemplated by the present invention for achieving first gear.

It will be appreciated that the foregoing explanation of operation and gear states of the multi-speed embodiment of the transmissions described herein assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. Further, the operation and establishment of various gear ratios of the transmissions are for example provided by the engagement of the torque transmitting elements, as shown in FIGS. 5, 30, 31 and 40.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members;
three interconnecting members each continuously interconnecting one of the first, second, and third members of the first, second, third and fourth planetary gear sets with another of the first, second, and third members of the first, second, third and fourth planetary gear sets;
a grounding member for continuously interconnecting at least one of the members of the planetary gear sets to a stationary member; and
six torque transmitting mechanisms wherein five of the six torque transmitting mechanisms are each selectively engageable to interconnect at least one of the first, second and third members of the first, second, third, and fourth planetary gear sets with at least one other of the first, second, third members of the first, second, third, and fourth planetary gear sets or a common structural member and wherein one of the six torque transmitting mechanisms is selectively engageable to interconnect at least one of the first, second and third members of the first, second, third, and fourth planetary gear sets with the stationary member, and
wherein the six torque transmitting mechanisms are selectively engageable in combinations of at least four to establish a plurality of forward speed ratios and at least one reverse speed ratio between the input member and the output member.

2. The transmission of claim 1 wherein the three interconnecting members further comprises a first interconnecting member continuously interconnecting a first member of the first planetary gear set with a first member of the second planetary gear set, a second interconnecting member continuously interconnecting a third member of the second planetary gear set with a third member of the third planetary gear set and a third interconnecting member continuously interconnecting a first member of the third planetary gear set with a third member of the fourth planetary gear set.

3. The transmission of claim 1 wherein the grounding member interconnects the third member of the first planetary gear set to the stationary member.

4. The transmission of claim 1 wherein a first of the six torque transmitting mechanisms is selectively engageable to interconnect the second member of the third planetary gear set with the common structural member.

5. The transmission of claim 4 wherein a second of the six torque transmitting mechanisms is selectively engageable to interconnect the third member of the second planetary gear set and the third member of the third planetary gear set with the common structural member.

6. The transmission of claim 5 wherein a third of the six torque transmitting mechanisms is selectively engageable to interconnect the first member of the fourth planetary gear set with the common structural member.

7. The transmission of claim 6 wherein a fourth of the six torque transmitting mechanisms is selectively engageable to interconnect the second member of the second planetary gear set and the input member with the third member of the fourth planetary gear set and the first member of the third planetary gear set.

8. The transmission of claim 7 wherein a fifth of the six torque transmitting mechanisms is selectively engageable to interconnect the second member of the first planetary gear set with the first member of the fourth planetary gear set.

9. The transmission of claim 8 wherein a sixth of the six torque transmitting mechanisms is selectively engageable to interconnect the first member of the first planetary gear set and the first member of the second planetary gear set with the stationary member.

10. The transmission of claim 1 wherein the input member is continuously connected for common rotation with the second member of the second planetary gear set and the output member is continuously connected for common rotation with the second member of the fourth planetary gear set.

11. The transmission of claim 1 wherein the first member of the first planetary gear set, the first member of the second planetary gear set, the third member of the third planetary gear set and the third member of the fourth planetary gear set are sun gears, the second members of the first, second, third and fourth planetary gear sets are carrier members and the third member of the first planetary gear set, the third member of the second planetary gear set, the first member of the third planetary gear set and the first member of the fourth planetary gear set are ring gears.

* * * * *